US011982732B2

(12) United States Patent
Choi et al.

(10) Patent No.: US 11,982,732 B2
(45) Date of Patent: May 14, 2024

(54) METHOD AND APPARATUS FOR PROCESSING RADAR SIGNAL BY CORRECTING PHASE DISTORTION

(71) Applicant: Samsung Electronics Co., Ltd., Suwon-si (KR)

(72) Inventors: Sungdo Choi, Suwon-si (KR); Seung Tae Khang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 17/121,956

(22) Filed: Dec. 15, 2020

(65) Prior Publication Data

US 2021/0382165 A1  Dec. 9, 2021

(30) Foreign Application Priority Data

Jun. 9, 2020 (KR) .................. 10-2020-0069571
Aug. 11, 2020 (KR) .................. 10-2020-0100625

(51) Int. Cl.
*G01S 13/58* (2006.01)
*G01S 13/02* (2006.01)
(Continued)

(52) U.S. Cl.
CPC ............ *G01S 13/589* (2013.01); *G01S 13/34* (2013.01); *G01S 13/931* (2013.01); *G01S 2013/0245* (2013.01)

(58) Field of Classification Search
CPC ...... G01S 13/589; G01S 13/34; G01S 13/931; G01S 2013/0245
(Continued)

(56) References Cited

U.S. PATENT DOCUMENTS 3,997,900 A * 12/1976 Chin .................... H01Q 25/004
343/705
5,117,377 A * 5/1992 Finman .................. G01S 7/4004
703/2

(Continued)

FOREIGN PATENT DOCUMENTS

CA     2619009 A1 *  7/2007  ............. G01S 13/34
CN     1847877 A     10/2006
(Continued)

OTHER PUBLICATIONS

Li Li et al.: "Software-defined calibration for FMCW phased-array radar", Radar Conferece, 2010 IEEE, IEEE, Pascataway, NJ, USA, May 10, 2010 (May 10, 2010), pp. 877-881, XP031696615, ISBN: 979-1-4244-5811-0 . (Year: 2010).*

(Continued)

*Primary Examiner* — Nuzhat Pervin
(74) *Attorney, Agent, or Firm* — NSIP Law

(57) ABSTRACT

Disclosed is a method and apparatus for processing a radar signal by correcting a phase distortion. The method includes generating radar data based on a radar transmission signal transmitted through an array antenna of a radar sensor based on a frequency modulation model and a radar reception signal received through the array antenna as the radar transmission signal is reflected by a target, correcting the radar data using a correction vector for correcting a feedline error occurring due to a feedline delay difference between channels of the array antenna, and estimating a direction of arrival corresponding to the corrected radar data using a direction matrix reflecting a phase shift of the corrected radar data according to frequency modulation characteristics of the frequency modulation model.

16 Claims, 14 Drawing Sheets

(51) Int. Cl.
*G01S 13/34* (2006.01)
*G01S 13/931* (2020.01)

(58) Field of Classification Search
USPC .......................................................... 342/70
See application file for complete search history.

(56) References Cited

U.S. PATENT DOCUMENTS

| | | | | |
|---|---|---|---|---|
| 5,430,453 | A * | 7/1995 | Rudish | G01S 7/021 |
| | | | | 342/373 |
| 5,493,304 | A * | 2/1996 | Lee | G01S 7/4052 |
| | | | | 342/173 |
| 7,498,972 | B2 | 3/2009 | Tanaka | |
| 9,435,884 | B2 * | 9/2016 | Inoue | G01S 13/56 |
| 9,541,638 | B2 * | 1/2017 | Jansen | G01S 13/878 |
| 9,791,552 | B1 | 10/2017 | Schuman | H01Q 3/267 |
| 11,435,471 | B2 * | 9/2022 | Cattle | G01S 7/411 |
| 2006/0022866 | A1 * | 2/2006 | Walton | H01Q 21/08 |
| | | | | 342/126 |
| 2008/0012756 | A1 * | 1/2008 | Stagliano | G01S 7/03 |
| | | | | 342/188 |
| 2008/0204322 | A1 * | 8/2008 | Oswald | G01S 5/04 |
| | | | | 342/465 |
| 2009/0273517 | A1 * | 11/2009 | Thiesen | H01Q 21/065 |
| | | | | 342/372 |
| 2012/0139776 | A1 * | 6/2012 | Malmqvist | H01Q 1/521 |
| | | | | 342/174 |
| 2013/0016003 | A1 * | 1/2013 | Stirling-Gallacher | H01Q 3/26 |
| | | | | 342/372 |
| 2015/0070207 | A1 * | 3/2015 | Millar | G01S 13/4454 |
| | | | | 342/174 |
| 2015/0198709 | A1 * | 7/2015 | Inoue | G01S 13/56 |
| | | | | 342/147 |
| 2015/0247924 | A1 * | 9/2015 | Kishigami | G01S 7/411 |
| | | | | 342/146 |
| 2016/0131752 | A1 * | 5/2016 | Jansen | G01S 13/42 |
| | | | | 342/27 |
| 2018/0292510 | A1 | 10/2018 | Rao et al. | |
| 2019/0170858 | A1 | 6/2019 | Lamb et al. | |
| 2020/0341112 | A1 * | 10/2020 | Itkin | G01S 7/4078 |
| 2021/0126661 | A1 * | 4/2021 | Galeev | H04B 1/1027 |
| 2021/0199797 | A1 | 7/2021 | Choi et al. | |

FOREIGN PATENT DOCUMENTS

| | | | | |
|---|---|---|---|---|
| CN | 104931968 | A | | 9/2015 |
| CN | 106990401 | A | | 7/2017 |
| CN | 109541558 | A | | 3/2019 |
| CN | 111537966 | B * | 6/2022 | G01S 7/4026 |
| EP | 3021132 | A1 * | 5/2016 | G01S 13/343 |
| EP | 3 324 205 | A1 | | 5/2018 |
| EP | 3324205 | A1 * | 5/2018 | G01S 13/343 |
| EP | 3923023 | A2 * | 12/2021 | G01S 13/34 |
| GB | 2534894 | A * | 8/2016 | G01S 3/02 |
| GB | 2534894 | A | | 8/2016 |
| KR | 10-2011-0097277 | A | | 8/2011 |

OTHER PUBLICATIONS

Song, Heemang, et al., "Improving DOA Estimation and Preventing Target Split Using Automotive Radar Sensor Arrays." *IEICE Transactions on Fundamentals of Electronics, Communications and Computer Sciences*, vol. 101, No. 3, Mar. 2018 (pp. 590-594).

Li, Li, et al., "Software-Defined Calibration for FMCW Phased-Array Radar," *2010 IEEE Radar Conference*, 2010 (pp. 1-5).

Extended European Search Report dated Jul. 23, 2021 in counterpart European Application No. 21154549.6 (11 pages in English).

* cited by examiner

METHOD AND APPARATUS FOR PROCESSING RADAR SIGNAL BY CORRECTING PHASE DISTORTION

CROSS-REFERENCE TO RELATED APPLICATIONS

This application claims the benefit under 35 USC § 119(a) of Korean Patent Application No. 10-2020-0069571 filed on Jun. 9, 2020, and Korean Patent Application No. 10-2020-0100625 filed on Aug. 11, 2020, in the Korean Intellectual Property Office, the entire disclosure of which is incorporated herein by reference for all purposes.

BACKGROUND

Field

The following description relates to a method and apparatus for processing a radar signal by correcting a phase distortion.

Description of Related Art

Advanced driver-assistance systems (ADAS) are systems that support driving to improve driver's safety and convenience and to avoid dangerous situations by using sensors mounted inside or outside vehicles.

The sensors used in ADAS may include a camera, an infrared sensor, an ultrasonic sensor, a LiDAR, and a radar. Among those sensors, radar is capable of stably measuring objects in the vicinity of a vehicle without being affected by surrounding environment, such as weather, when compared to optical-based sensors.

Summary

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of processing a radar signal, the method including generating radar data based on a radar transmission signal transmitted through an array antenna of a radar sensor based on a frequency modulation model and a radar reception signal received through the array antenna as the radar transmission signal is reflected by a target, correcting the radar data using a correction vector for correcting a feedline error occurring due to a feedline delay difference between channels of the array antenna, and estimating a direction of arrival corresponding to the corrected radar data using a direction matrix reflecting a phase shift of the corrected radar data according to frequency modulation characteristics of the frequency modulation model.

The correction vector may be configured to correct the radar data so that phase components for the channels of the radar data have a same value, in response to the radar reception signal being received from a target positioned in front of the radar sensor.

The direction matrix may include sub-direction matrices respectively corresponding to different sample indices.

The estimating of the direction of arrival may include obtaining a first sub-direction matrix corresponding to a first sample index from among the sub-direction matrices, and estimating a first direction of arrival of first sub-radar data corresponding to the first sample index from the corrected radar data using the first sub-direction matrix.

The generating of the radar data may include generating the radar data by sampling an intermediate frequency (IF) signal generated based on the radar transmission signal and the radar reception signal.

The estimating of the direction of arrival may include correcting an element beam pattern (EBP) error occurring due to an influence of a beam pattern of an antenna element in the array antenna on a beam pattern of the array antenna.

The estimating of the direction of arrival may include estimating an initial direction of arrival corresponding to the corrected radar data by using the direction matrix, and estimating a final direction of arrival corresponding to the corrected radar data by removing an EBP error in the initial direction of arrival due to an influence of a beam pattern of an antenna element of the array antenna on a beam pattern of the array antenna.

The estimating of the final direction of arrival may include determining an EBP error value for the initial direction of arrival corresponding to the corrected radar data based on an EBP error model configured to represent EBP error values for each angle, and estimating the final direction of arrival corresponding to the corrected radar data by correcting the initial direction of arrival with the determined EBP error value.

The EBP error model may be generated by estimating EBP error values for other angles based on EBP error values for base angles measured through tests.

The radar transmission signal may include a chirp signal with a carrier frequency modulated based on the frequency modulation model.

The radar reception signal may be received through reception antenna elements in the array antenna, and the channels are formed based on the reception antenna elements.

The method may include estimating at least one of a range and a velocity for the target based on the radar data, wherein a vehicle equipped with an apparatus for processing a radar signal is controlled based on any one or any combination of the direction of arrival, the range, and the velocity.

In another general aspect, there is provided an apparatus for processing a radar signal, the apparatus including a radar sensor configured to transmit a radar transmission signal through an array antenna based on a frequency modulation model and to receive a radar reception signal through the array antenna as the radar transmission signal is reflected by a target, and a processor configured to generate radar data based on the radar transmission signal and the radar reception signal, to correct the radar data using a correction vector for correcting a feedline error occurring due to a feedline delay difference between channels of the array antenna, and to estimate a direction of arrival corresponding to the corrected radar data using a direction matrix reflecting a phase shift of the corrected radar data according to frequency modulation characteristics of the frequency modulation model.

The correction vector may be configured to correct the radar data so that phase components for the channels of the radar data have a same value, in response to the radar reception signal being received from a target positioned in front of the radar sensor.

The direction matrix may include sub-direction matrices respectively corresponding to different sample indices, and the processor may be configured to obtain a first sub-direction matrix corresponding to a first sample index from among the sub-direction matrices, and to estimate a first direction of arrival of first sub-radar data corresponding to the first sample index from the corrected radar data using the first sub-direction matrix.

The processor may be configured to correct an element beam pattern (EBP) error occurring due to an influence of a beam pattern of an antenna element in the array antenna on a beam pattern of the array antenna.

In another general aspect, there is provided a vehicle, including a radar sensor configured to transmit a radar transmission signal through an array antenna based on a frequency modulation model and to receive a radar reception signal through the array antenna as the radar transmission signal is reflected by a target, a processor configured to generate radar data based on the radar transmission signal and the radar reception signal, to correct the radar data using a correction vector for correcting a feedline error occurring due to a feedline delay difference between channels of the array antenna, and to estimate a direction of arrival corresponding to the corrected radar data using a direction matrix reflecting a phase shift of the corrected radar data according to frequency modulation characteristics of the frequency modulation model, and a controller configured to control the vehicle based on the direction of arrival.

The direction matrix may include sub-direction matrices respectively corresponding to different sample indices, and the processor may be configured to obtain a first sub-direction matrix corresponding to a first sample index from among the sub-direction matrices, and to estimate a first direction of arrival of first sub-radar data corresponding to the first sample index from the corrected radar data using the first sub-direction matrix.

The processor may be configured to correct an element beam pattern (EBP) error occurring due to an influence of a beam pattern of an antenna element in the array antenna on a beam pattern of the array antenna.

In another general aspect, there is provided a method of processing a radar signal, the method including generating radar data based on a radar transmission signal transmitted through an array antenna of a radar sensor based on a frequency modulation model and a radar reception signal received through the array antenna as the radar transmission signal is reflected by a target, correcting the radar data using a correction vector for correcting a feedline error occurring due to a feedline delay difference between channels of the array antenna, estimating an initial direction of arrival corresponding to the corrected radar data using the direction matrix, and determining a final direction of arrival corresponding to the corrected radar data by removing an element beam pattern (EBP) error in the initial direction of arrival based on an EBP error model configured to represent EBP error values for each angle, wherein the EBP error comprises an influence of a beam pattern of an antenna element of the array antenna on a beam pattern of the array antenna.

The direction matrix may include sub-direction matrices respectively corresponding to different sample indices, and the estimating of the initial direction of arrival comprises obtaining a first sub-direction matrix corresponding to a first sample index from among the sub-direction matrices, and estimating a first direction of arrival of first sub-radar data corresponding to the first sample index from the corrected radar data using the first sub-direction matrix.

Other features and aspects will be apparent from the following detailed description, the drawings, and the claims.

Figure 1:
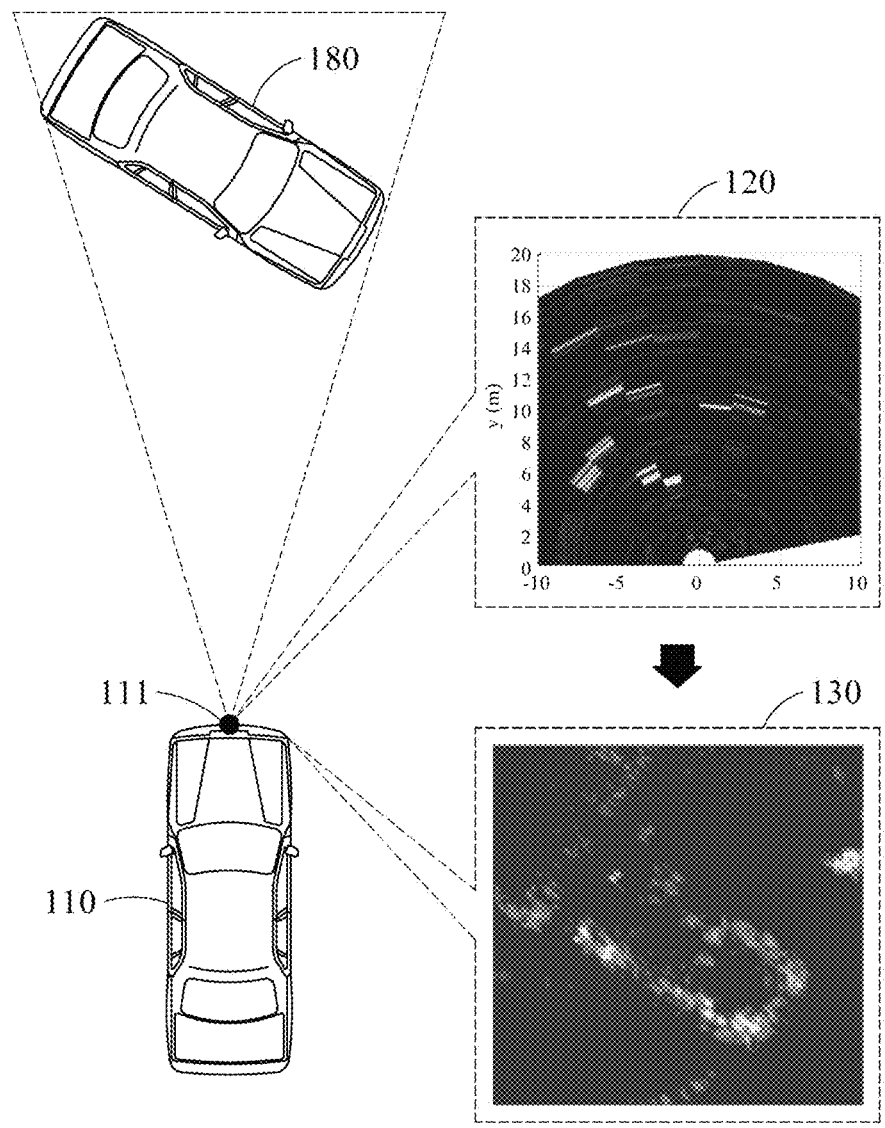
FIG. 1 illustrates an example of recognizing a surrounding environment through a radar signal processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of recognizing a surrounding environment through a radar signal processing method. Referring to FIG. 1, a radar signal processing apparatus 110 may detect information on a target 180 ahead (for example, range, velocity, direction, and the like) by analyzing a radar signal received from a radar sensor 111. The radar sensor 111 may be positioned inside or outside the radar signal processing apparatus 110, and the radar signal processing apparatus 110 may detect the information on the target 180 ahead based on both the radar signal received from the radar sensor 111 and data collected by another sensor (for example, an image sensor, etc.). Resolving power in radar data processing may be divided into resolving power performance in terms of hardware and resolving power performance in terms of software. Hereinafter, improvement of the resolving power performance in terms of software will be mainly described.

In an example, the resolving power refers to the power of a device to discriminate a very small change, for example, smallest unit discriminative power, and it may be expressed as "resolving power=(discriminable smallest scale unit)/(total operation range)". The smaller the resolving power value of the device, the more precise results the device may output. The resolving power value may also be referred to as the resolving power unit. For example, if the device has a small resolving power value, the device may discriminate a relatively small unit and thus, the device may output results with increased resolution and improved precision. If the device has a great resolving power value, the device may not discriminate a small unit and thus, output results with reduced resolution and reduced precision.

The radar signal processing apparatus 110 may be mounted on a vehicle as shown in FIG. 1. The vehicle may perform adaptive cruise control (ACC), automatic emergency braking (AEB), blind spot detection (BSD), lane change assistance (LCA), and other similar operations based on the range to the target 180 detected by the radar signal processing apparatus 110.

Furthermore, the radar signal processing apparatus 110 may generate a surrounding map 130 in addition to detecting the range. The surrounding map 130 is a map representing the positions of various targets existing around the radar signal processing apparatus 110, such as the target 180. The targets may include moving objects such as vehicles and people, and static objects such as guardrails and traffic lights present in the background.

The surrounding map 130 may be generated using single scan imaging. Single scan imaging refers to a technique of the radar signal processing apparatus 110 acquiring a single scan image 120 from the sensor and generating the surrounding map 130 from the acquired single scan image 120. The single scan image 120 is an image generated from the radar signal sensed by a single radar sensor 111, and may represent the ranges indicated by radar signals received at a predetermined elevation angle with a relatively high resolving power. For example, in the single scan image 120 shown in FIG. 1, the horizontal axis may denote the steering angle of the radar sensor 111, and the vertical axis may denote the range from the radar sensor 111 to the target 180. However, the form of a single scan image is not limited to that shown in FIG. 1. The single scan image may be represented in a different format according to design.

The steering angle may be an angle corresponding to a target direction from the radar signal processing apparatus 110 toward the target 180. For example, the steering angle may be an angle between the target direction and the traveling direction of the radar signal processing apparatus 110 (or the vehicle including the radar signal processing apparatus 110). In an example, the steering angle is described mainly based on a horizontal angle, but is not limited thereto. For example, the steering angle may also be applied to an elevation angle.

The radar signal processing apparatus 110 may obtain information on the shape of the target 180 through a multi-radar map. The multi-radar map may be generated from a combination of a plurality of radar scan images. For example, the radar signal processing apparatus 110 may generate the surrounding map 130 by spatiotemporally combining the radar scan images acquired as the radar sensor 111 moves. The surrounding map 130 may be a type of radar image map and used for pilot parking.

The radar signal processing apparatus 110 may use direction of arrival (DOA) information to generate the surrounding map 130. The DOA information refers to information indicating the direction in which a radar signal reflected from a target is received. The radar signal processing apparatus 110 may identify the direction in which the target exists relative to the radar sensor 111 using the DOA information described above. Therefore, such DOA information may be used to generate radar scan data and surrounding maps.

Radar information, such as range, velocity, DOA, and map information, about the target 180 generated by the radar signal processing apparatus 110 may be used to control the vehicle equipped with the radar signal processing apparatus 110. For example, controlling the vehicle may include controlling the speed and steering of the vehicle, such as ACC, AEB, BSD, and LCA. A control system of the vehicle may control the vehicle directly or indirectly based on the radar information.

Figure 2:
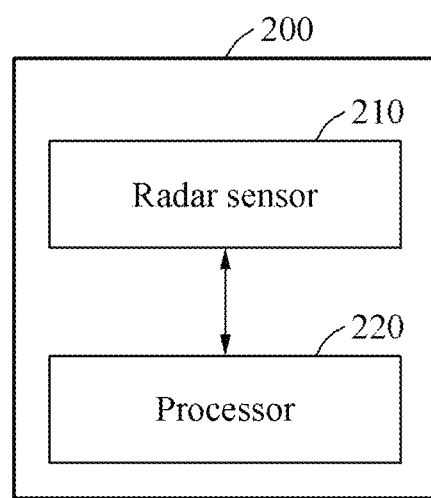
FIG. 2 illustrates an example of a configuration of a radar signal processing apparatus.

FIG. 2 illustrates an example of a configuration of a radar signal processing apparatus. Referring to FIG. 2, a radar signal processing apparatus 200 may include a radar sensor 210 and a processor 220. The radar sensor 210 may radiate a radar signal to the outside of the radar sensor 210 and receive a signal as the radiated radar signal is reflected by a target. Here, the radiated radar signal will be referred to as a radar transmission signal, and the received signal may be referred to as a radar reception signal. The radar transmission signal may include a chirp signal with a carrier frequency modulated based on a frequency modulation model. The frequency of the radar transmission signal may change within a predetermined band. For example, the frequency of the radar transmission signal may linearly change within a predetermined band.

The radar sensor 210 may include an array antenna and be configured to transmit a radar transmission signal and receive a radar reception signal through the array antenna. The array antenna may include a plurality of antenna elements. Multiple input multiple output (MIMO) may be implemented through the plurality of antenna elements. In this case, a plurality of MIMO channels may be formed by the plurality of antenna elements. For example, a plurality of channels corresponding to M×N virtual antennas may be formed through M transmission antenna elements and N reception antenna elements. Here, radar reception signals received through the channels may have different phases according to reception directions.

Radar data may be generated based on the radar transmission signal and the radar reception signal. For example, the radar sensor 210 may transmit the radar transmission signal through the array antenna based on the frequency modulation model, receive the radar reception signal through the array antenna when the radar transmission signal is reflected by the target, and generate an intermediate frequency (IF) signal based on the radar transmission signal and the radar reception signal. The IF signal may have a frequency corresponding to a difference between the frequency of the radar transmission signal and the frequency of the radar reception signal. The processor 220 may generate radar data through a sampling operation on the IF signal. The radar data may correspond to raw data of an IF.

The processor 220 may generate and use information on the target based on the radar data. For example, the processor 220 may perform range fast Fourier transform (FFT), Doppler FFT, constant false alarm rate (CFAR) detection, DOA estimation, and the like based on the radar data, and obtain the information on the target, such as range, velocity, and direction. Such information on the target may be provided for various applications such as AAC, AEB, BSD, and LCA.

Figure 3:
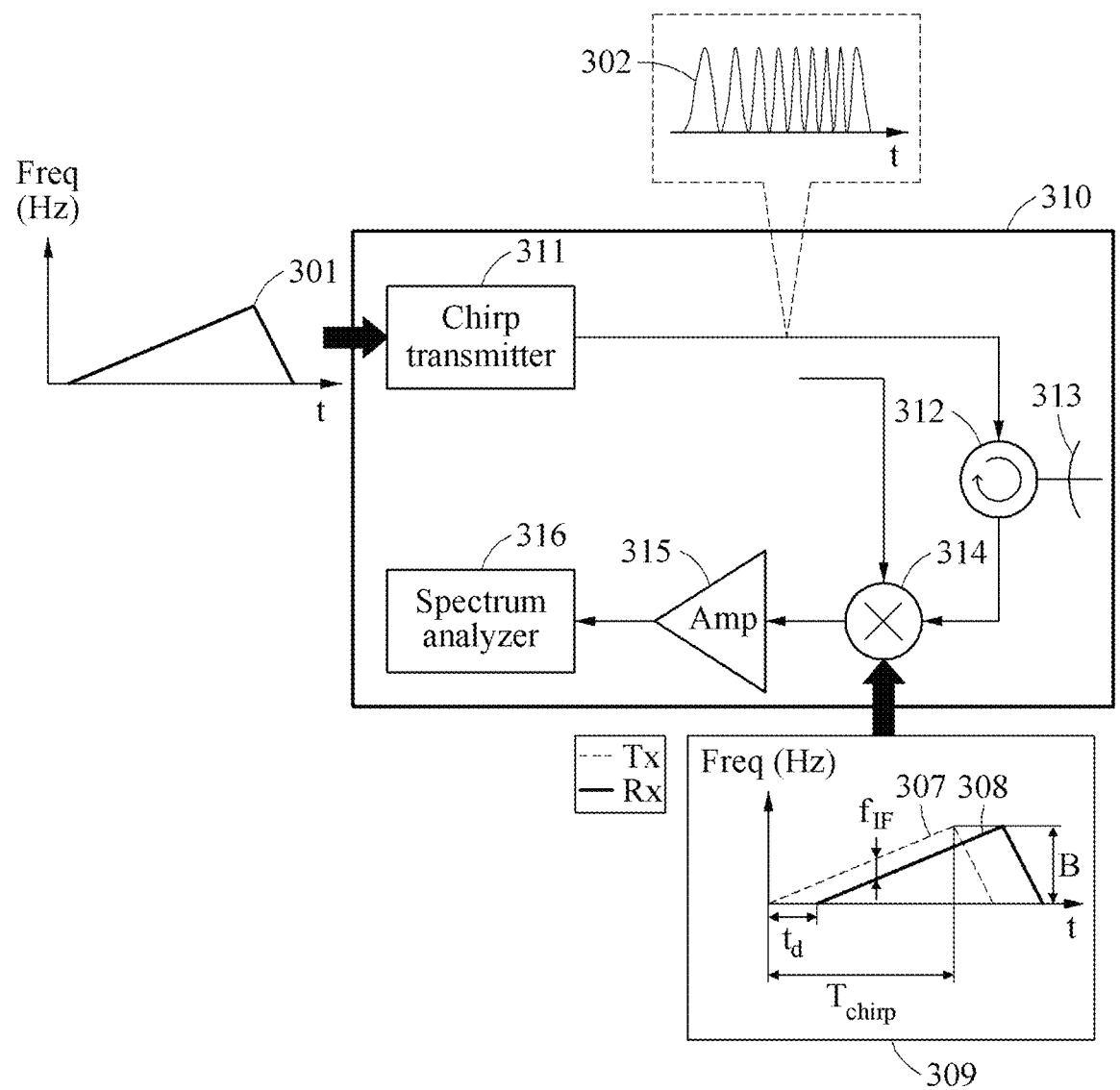
FIG. 3 illustrates an example of a configuration of a radar sensor.

FIG. 3 illustrates an example of a configuration of a radar sensor. Referring to FIG. 3, a radar sensor 310 may include a chirp transmitter 311, a duplexer 312, an antenna 313, a frequency mixer 314, an amplifier 315, and a spectrum analyzer 316. The radar sensor 310 may radiate a signal through the antenna 313 and may receive a signal through the antenna 313. Although FIG. 3 shows a single antenna 313, the antenna 313 may include at least one transmission antenna element and at least one reception antenna element. For example, the antenna 313 may correspond to an array antenna. For example, the antenna 313 may include three or more reception antenna elements. In this case, the reception antenna elements may be spaced apart at equal intervals.

The radar sensor 310 may be, for example, a millimeter-wave (mmWave) radar and be configured to measure the range to a target by analyzing a time of flight (ToF) and changes in the waveform of the radar signal, wherein the ToF is the time it takes for a radiated electromagnetic wave to return after reflected by the target. For reference, the mmWave radar may detect an object regardless of external environment changes such as fog, rain, and the like, compared to optical sensors including cameras. In addition, the mmWave radar has excellent cost performance compared to LiDAR and thus, is one of the sensors that may compensate for the disadvantages of the cameras described above. For example, the radar sensor 310 may be implemented as a frequency modulated continuous wave (FMCW) radar. The FMCW radar may be robust against external noise.

The chirp transmitter 311 may generate a frequency modulated signal (FM signal) 302 with a frequency that changes with time. For example, the chirp transmitter 311 may generate the FM signal 302 by performing frequency modulation according to the frequency modulation characteristics of a frequency modulation model 301. The FM signal 302 may also be referred to as a chirp signal. Herein, the frequency modulation model 301 may be a model configured to represent changes in a carrier frequency of a radar transmission signal during a provided transmission time. The vertical axis of the frequency modulation model 301 may denote the carrier frequency, and the horizontal axis thereof may denote time. For example, the frequency modulation model 301 may have a frequency modulation characteristic of linearly changing (for example, linearly increasing or linearly decreasing) the carrier frequency. As another example, the frequency modulation model 301 may have a frequency modulation characteristic of non-linearly changing the carrier frequency.

FIG. 3 shows the frequency modulation model 301 having a frequency modulation characteristic of linearly increasing the frequency over time. The chirp transmitter 311 may generate the FM signal 302 having a carrier frequency according to the frequency modulation model 301. For example, as shown in FIG. 3, the FM signal 302 may exhibit a waveform in which the carrier frequency gradually increases in some intervals, and exhibit a waveform in which the carrier frequency gradually decreases in the remaining intervals. The chirp transmitter 311 may transmit the FM signal 302 to the duplexer 312.

The duplexer 312 may determine a transmission path and a reception path for signals through the antenna 313. For example, while the radar sensor 310 radiates the FM signal 302, the duplexer 312 may form a signal path from the chirp transmitter 311 to the antenna 313, transmit the FM signal 302 to the antenna 313 through the formed signal path, and then radiate the FM signal 302 to the outside. While the radar sensor 310 receives the signal reflected from the target, the duplexer 312 may form a signal path from antenna 313 to the spectrum analyzer 316. The antenna 313 may receive a reception signal returning as the radiated signal reaches and is reflected by an obstacle. The radar sensor 310 may transmit the reception signal to the spectrum analyzer 316 through the signal path from the antenna 313 to the spectrum analyzer 316. The signal radiated through the antenna 313 may be referred to as a radar transmission signal, and the signal received through the antenna 313 may be referred to as a radar reception signal.

The frequency mixer 314 may demodulate a linear signal before frequency modulation (for example, the original chirp signal) from the received signal. The amplifier 315 may amplify the amplitude of the demodulated linear signal.

The spectrum analyzer 316 may compare a frequency 308 of the radar reception signal that is reflected from the target and received and a frequency 307 of the radar transmission signal. For reference, the frequency 307 of the radar transmission signal may change as the carrier frequency indicated by the frequency modulation model 301 changes. The spectrum analyzer 316 may detect a frequency difference between the frequency 308 of the radar reception signal and the frequency 307 of the radar transmission signal. In a graph 309 shown in FIG. 3, the frequency difference between the radar transmission signal and the radar reception signal is constant during an interval in which the carrier frequency linearly increases along the time axis in the frequency modulation model 301, and is proportional to the range between the radar sensor 310 and the target. Accordingly, the range between the radar sensor 310 and the target may be derived from the frequency difference between the radar transmission signal and the radar reception signal. The spectrum analyzer 316 may transmit the analyzed information to a processor of a radar signal processing apparatus.

For example, the spectrum analyzer 316 may calculate the range between the radar sensor 310 and the target using Equation 1.

$$R = \frac{cT_{chirp}f_{IF}}{2B} \quad \text{[Equation 1]}$$

In Equation 1, R denotes the range between the radar sensor 310 and the target. C denotes the speed of light. $T_{chirp}$ denotes the length of time of a rising interval of the carrier frequency in the frequency modulation model 301. $f_{IF}$ denotes a frequency difference between the radar transmission signal and the radar reception signal at a point in the rising interval, and may be referred to as an IF or a beat frequency. B denotes a modulation bandwidth. In an example, the IF $f_{IF}$ may be derived through Equation 2.

$$f_{IF} = \frac{t_d B}{T_{chirp}} \quad \text{[Equation 2]}$$

In Equation 2, $f_{IF}$ denotes the IF, and $t_d$ denotes a time difference (for example, a delay time) between the time at which the radar transmission signal is radiated and the time at which the radar reception signal is received, that is, a round-trip delay time for the target.

A plurality of radar sensors may be installed in various parts of a vehicle, and a radar signal processing apparatus may calculate a distance to a target, a direction, and a relative velocity in all directions of the vehicle based on information sensed by the plurality of radar sensors. The radar signal processing apparatus may be mounted on the vehicle, and may provide various functions (for example, ACC, AEB, BSD, LCA, etc.) that are useful for driving by using the calculated information.

Each of the plurality of radar sensors may radiate a radar transmission signal including a chirp signal with a frequency modulated based on a frequency modulation model to the outside and receive a signal reflected from the target. The processor of the radar signal processing apparatus may determine the distance from each of the plurality of radar sensors to a target from a frequency difference between the radiated radar transmission signal and the received radar reception signal. In addition, when the radar sensor 310 has a plurality of channels, the processor of the radar signal processing apparatus may derive a DOA of the radar reception signal reflected from the target based on phase information in the radar data.

The radar sensor 310 may use a wide bandwidth and adopt MIMO to meet the demands for a wide field of view (FoV) and a high resolution (HR) for various applications. The range resolution may increase through the wide bandwidth, and the angular resolution may increase through MIMO. The range resolution may represent the smallest unit to discriminate distance information on the target, and the angle resolution may represent the smallest unit to discriminate DOA information on the target. For example, the radar sensor 210 may use a broadband such as 4 GHz, 5 GHz, or 7 GHz instead of a narrow band such as 200 MHz, 500 MHz, or 1 GHz. As MIMO is adopted, the possibility of phase distortion between channels may increase. Therefore, there is a demand for correcting the phase distortion of the array antenna for a wide FoV.

The processor of the radar signal processing apparatus may correct such a phase distortion of the array antenna, in the process of processing the radar data to generate information on the target. A beam pattern of the array antenna may be modeled to include a feedline error caused by a feedline delay difference between channels, a phase shift error of the radar data according to the frequency modulation characteristics of the frequency modulation model, and an EBP error caused by an influence of a beam pattern of an antenna element on the beam pattern of the array antenna. The processor may eliminate the phase distortion present in the beam pattern of the array antenna by correct each error. A process of correcting each error will be described in detail later.

Figure 4:
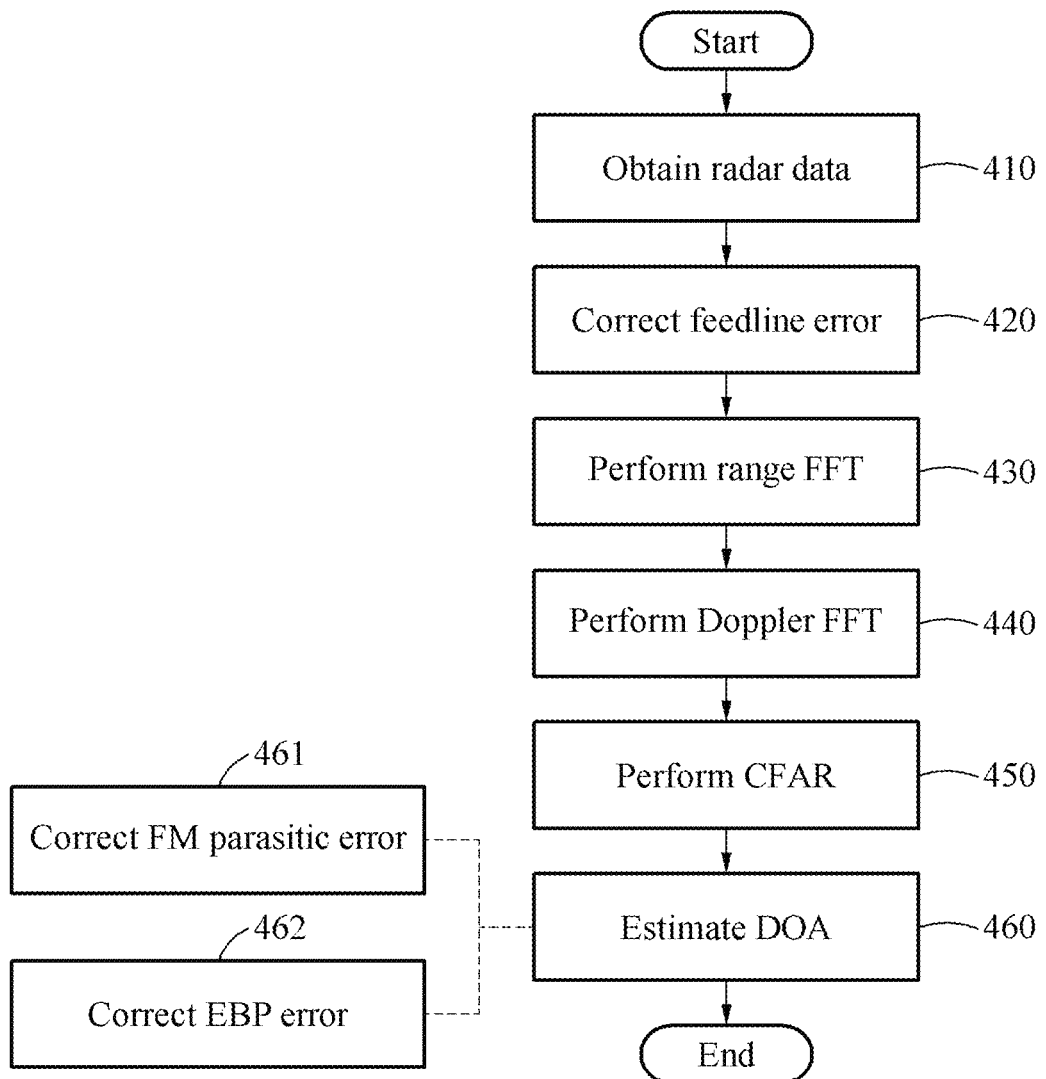
FIG. 4 illustrates an example of processing a radar signal through phase distortion correction.

FIG. 4 illustrates an example of processing a radar signal through phase distortion correction. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, a radar signal processing apparatus obtains radar data. The radar signal processing apparatus may generate the radar data based on a radar transmission signal transmitted through an array antenna of a radar sensor based on a frequency modulation model and a radar reception signal received through the array antenna as the radar transmission signal is reflected by a target. For example, the radar signal processing apparatus may generate an IF signal based on the radar transmission signal and the radar reception signal, and generate the radar data through a sampling operation on the IF signal.

The radar signal processing apparatus may generate information on the target based on the radar data. For example, the radar signal processing apparatus may perform range FFT in operation 430, perform Doppler FFT in operation 440, perform CFAR in operation 450, and estimate a DOA in operation 460. Through this, the radar signal processing apparatus may obtain the information on the target such as range, speed, direction, and the like.

More specifically, the radar data are three-dimensional data, wherein the axes thereof respectively correspond to the time taken from the transmission of an electromagnetic wave to the reception thereof by a radar sensor, a change between transmitted chirp signals in one scan, and a change in chirp signals received at virtual antennas. The axes of the radar data may be converted into a range axis, a radial velocity axis, and an angle axis through preprocessing. The radial velocity may be a relative velocity of the target when the radar sensor faces the target.

For example, the radar signal processing apparatus may process the radar data in the order of range FFT, Doppler FFT, and DOA estimation. However, since the axes of the radar data correspond to separable information, the same results may be obtained even when FFT and digital beamforming (DBF) operations are applied in a different order. For reference, the angle axis may be an axis related to a horizontal angle, for example, an azimuth angle. Although a horizontal angle is mainly described herein, examples are not limited thereto. The angle axis may be an axis relating to both the horizontal angle and an elevation angle.

In an example, in the range FFT operation, the radar signal processing apparatus may obtain a range value by applying an FFT operation to the time taken until the electromagnetic wave is transmitted and received in the radar data. The radar signal processing apparatus may estimate an angle corresponding to the DOA of the radar signal reflected from the target through DOA estimation. For example, the radar signal processing apparatus may estimate the DOA using the MUSIC algorithm, the Bartlett algorithm, the MVDR algorithm, DBF, and estimation of signal parameters via rotational invariance techniques (ESPIRT). The radar signal processing apparatus may estimate a radial velocity (for example, a Doppler velocity) from the signal change between the chirp signals along a Doppler axis, through Doppler FFT. In the Doppler FFT operation, the radar signal processing apparatus may obtain the radial velocity at a predetermined range and a predetermined angle, by applying an FFT operation to a signal change between chirp signals at the range and the angle.

CFAR is a technique of determining the probability of a predetermined point (for example, cell under test (CUT)) being a target based on a neighboring cell of the point, and a technique for thresholding based on a threshold determined using a signal intensity (for example, noise floor) of the neighboring cell and on a signal intensity sensed for the point by the radar sensor. For example, if the signal intensity sensed from the point is greater than the threshold determined based on the signal intensity sensed from the neighboring cell, the radar signal processing apparatus may determine the point to be a target. In another example, if the signal intensity sensed from the point is less than or equal to the threshold, the radar signal processing apparatus may determine the point to be a non-target.

The beam pattern of the array antenna of the radar sensor may be defined as in Equation 3.

$$\text{Beam Pattern} = \sum_{n=1}^{N} \frac{1}{\sqrt{N}} EP_n(\theta) e^{jk(n-1)d\sin\theta} e^{j\varphi n} \quad \text{[Equation 3]}$$

In Equation 3, n denotes an index for identifying an antenna element. n may be an integer value between 1 and N. N is the total number of antenna elements. $EP_n(\theta)$ denotes an EBP of an n-th antenna element about a DOA θ. $k^t$ denotes a wave number at time t. d denotes the distance between two neighboring antenna elements. $\varphi_n$ denotes a feedline delay in the n-th antenna element.

Referring to Equation 3, the beam pattern may include a feedline error according to $e^{j\varphi_n}$, an FM parasitic error according to $k^t$, and an EBP error according to $EP_n(\theta)$. These errors may cause phase distortion. In detail, $e^{j\varphi_n}$ indicates that a feedline delay difference may occur between channels, and this difference may cause a feedline error. In addition, $k^t$ indicates that the wave number, wavelength, and frequency may change over time.

If the radar signal processing apparatus employs FMCW, the frequency may change over time, such that the radar data may include a phase shift error due to the frequency change. Since frequency modulation causes a phase shift error, the phase shift error may also be referred to as an FM parasitic error. In addition, $EP_n(\theta)$ may affect an array factor (AF) of the array antenna and deform the AF. Therefore, $EP_n(\theta)$ may cause an EBP error.

In the process of processing a radar signal, such errors may be corrected. For example, error correction may include operation 420 of correcting a feedline error, operation 461 of correcting an FM parasitic error, and operation 462 of correcting an EBP error. Hereinafter, the process of correcting each error will be described in detail.

In operation 420, the radar signal processing apparatus corrects a feedline error in the radar data. The radar signal processing apparatus may correct the radar data using a correction vector. The correction vector may be designed to correct a feedline error occurring due to a feedline delay in channels of the array antenna.

For example, if a radar transmission signal is reflected by a target positioned in front of the radar sensor and a radar reception signal is received through a plurality of channels of the radar sensor in a test environment (for example, anechoic chamber), phase components related to the channels in reference data (radar data obtained in a circumstance where the angle of the target in the test environment is known) of the radar reception signal should have the same value. For example, since the target is positioned in front of the radar sensor, the DOA of the reference data corresponds to 0 degrees. In this case, the phase components of the channels should all have the same value corresponding to 0 degrees.

If the phase components do not have the same value, a vector for correcting the phase components to have the same value may be determined. The correction vector may be determined through this process. Therefore, if the correction vector is predetermined through this process and the radar reception signal is received from the target positioned in front of the radar sensor, the correction vector may correct the radar data such that the phase components related to the channels of the radar data have the same value.

In operation 460, the radar signal processing apparatus estimates a DOA. In this case, operation 461 of correcting an FM parasitic error and operation 462 of correcting an EBP error may be performed in relation to DOA estimation.

First, an FM parasitic error may be corrected through various methods of compensating for a change in frequency over time. A direction matrix may be designed to reflect the change in frequency. The direction matrix may include a plurality of direction vectors respectively corresponding to predetermined angles, and each direction vector may have phase values for each channel. Each phase value may be determined mathematically. For example, assuming that the radar reception signal is received from the target at a first angle that is known, phase values corresponding to the radar reception signal may be calculated, and the phase values may be assigned to a first direction vector of the first angle. Through this process, phase values of each direction vector may be calculated.

If a radar reception signal is received during the actual use of radar after the direction matrix is completed, a direction vector corresponding to the radar data may be selected based on an operation that is based on the radar data of the radar reception signal and each direction vector of the direction matrix. The DOA of the radar reception signal may be estimated to be the angle of the selected direction vector. For example, if the first direction vector is selected in the direction matrix, the DOA of the radar reception signal may be estimated to be the first angle. In an example, the actual use process (online) may be construed as being different from the design and derivation process (offline).

In the process of deriving the direction matrix described above, a change in frequency over time may be considered. For example, a separate sub-direction matrix may be designed according to a sample index. In an example, in the actual use of radar after the direction matrix is derived, a corresponding direction matrix may be selected according to a sample index of the radar data. For example, a first sub-direction matrix of the direction matrix may be designed for a first sample index, and a second sub-direction matrix of the direction matrix may be designed for a second sample index.

In an example, to estimate a DOA during the actual use process, the first sub-direction matrix may be used for first sub-radar data of the radar data corresponding to the first sample index, and the second sub-direction matrix may be used for second sub-radar data of the radar data corresponding to the second sample index. As such, the FM parasitic error may be corrected through the direction matrix designed in consideration of the change in frequency. The process of deriving the direction matrix will be described in more detail later.

An EBP error may be corrected through an EBP error model. The EBP error model may represent EBP error values for each angle. For example, the radar signal processing apparatus may determine an EBP error value for an initial DOA corresponding to the radar data based on the EBP error model, and estimate a final DOA by correcting the initial DOA with the determined EBP error value. The EBP error model may be generated by estimating EBP error values for other angles based on EBP error values for base angles measured through a test. For example, the other EBP error values may be estimated through polynomial regression (PR), or various interpolation or fitting techniques.

The feedline error, the FM parasitic error, and the EBP error may be sequentially corrected. For example, when a correction vector for correcting the feedline error is obtained, a corrected direction matrix may be derived using an AF from which the feedline error is removed. Then, corrected reference data may be obtained by applying the correction vector to reference data obtained for the base angles, and EBP error values for the base angles may be obtained based on the corrected reference data and the corrected direction matrix. Thereafter, an EBP error model may be obtained by performing PR, interpolation, or fitting through the EBP error values for the base angles. Errors that may complexly act on each other may be relatively easily eliminated through the sequential correction operations described above.

Figure 5:
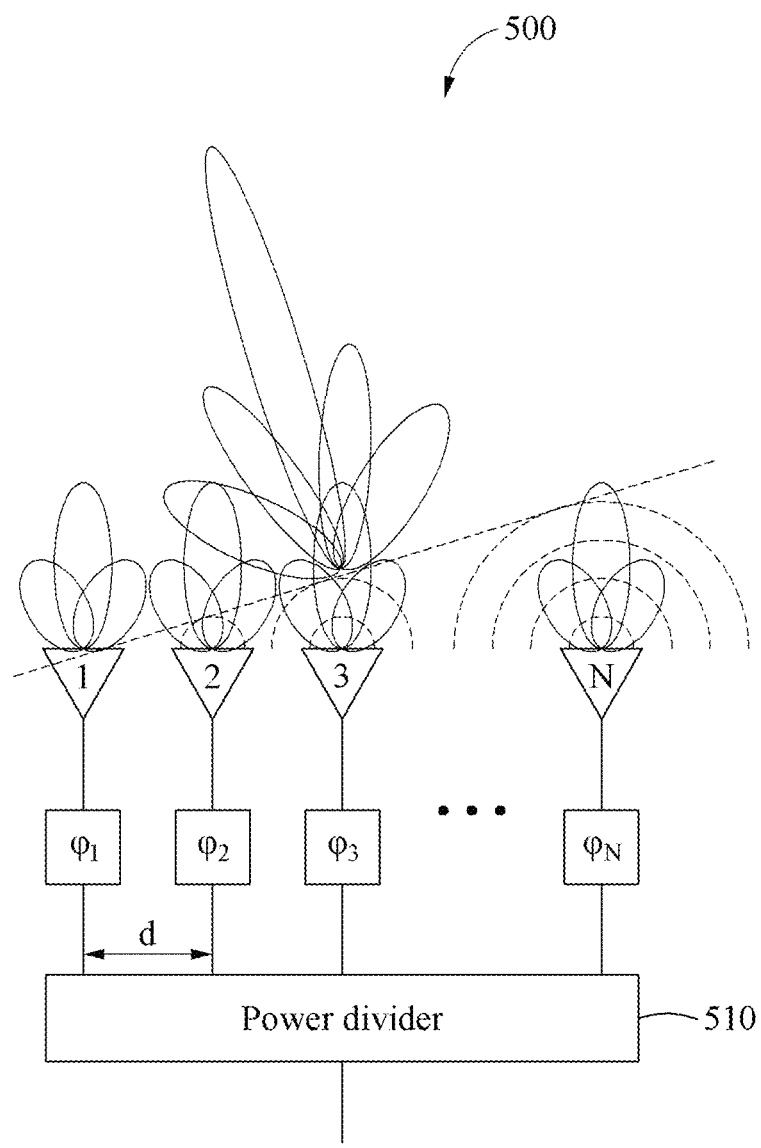
FIG. 5 illustrates an example of a feed line delay in an array antenna.

FIG. 5 illustrates an example of a feed line delay in an array antenna. Referring to FIG. 5, a radar sensor 500 may include an array antenna including first to N-th antenna elements, and a power divider 510. Neighboring antenna elements (for example, the first and second antenna elements) are defined as being separated by a distance d. The first to N-th antenna elements may individually form element beam patterns (EBPs), and the EBPs may form the overall beam pattern of the array antenna.

The power divider 510 may divide a transmission signal to the first to N-th antenna elements. In this example, due to physical factors (for example, the length of transmission lines, impedance, etc.) between the power divider 510 and the first to N-th antenna elements, the transmission signal may reach each of the first to N-th antenna elements at a different time. For example, the time at which the transmission signal reaches the first antenna element may be different from the time at which the transmission signal reaches the second antenna element. The times at which the transmission signal reaches the first to N-th antenna elements may be referred to as feedline delays $\varphi_1$ to $\varphi_N$, respectively, and an error caused by differences in the feedline delays $\varphi_1$ to $\varphi_N$ may be referred to as a feedline error.

A radar transmission signal may be transmitted to each channel of the array antenna under the assumption that the channels have the same phase. Thus, such a feedline error may cause phase distortion in the radar signal. Therefore, such phase distortion needs to be eliminated through correction. In Equation 3 above, the feedline error is reflected as the component $e^{j\varphi_n}$, and the component $e^{j\varphi_n}$ may be removed through correction.

Figure 6:
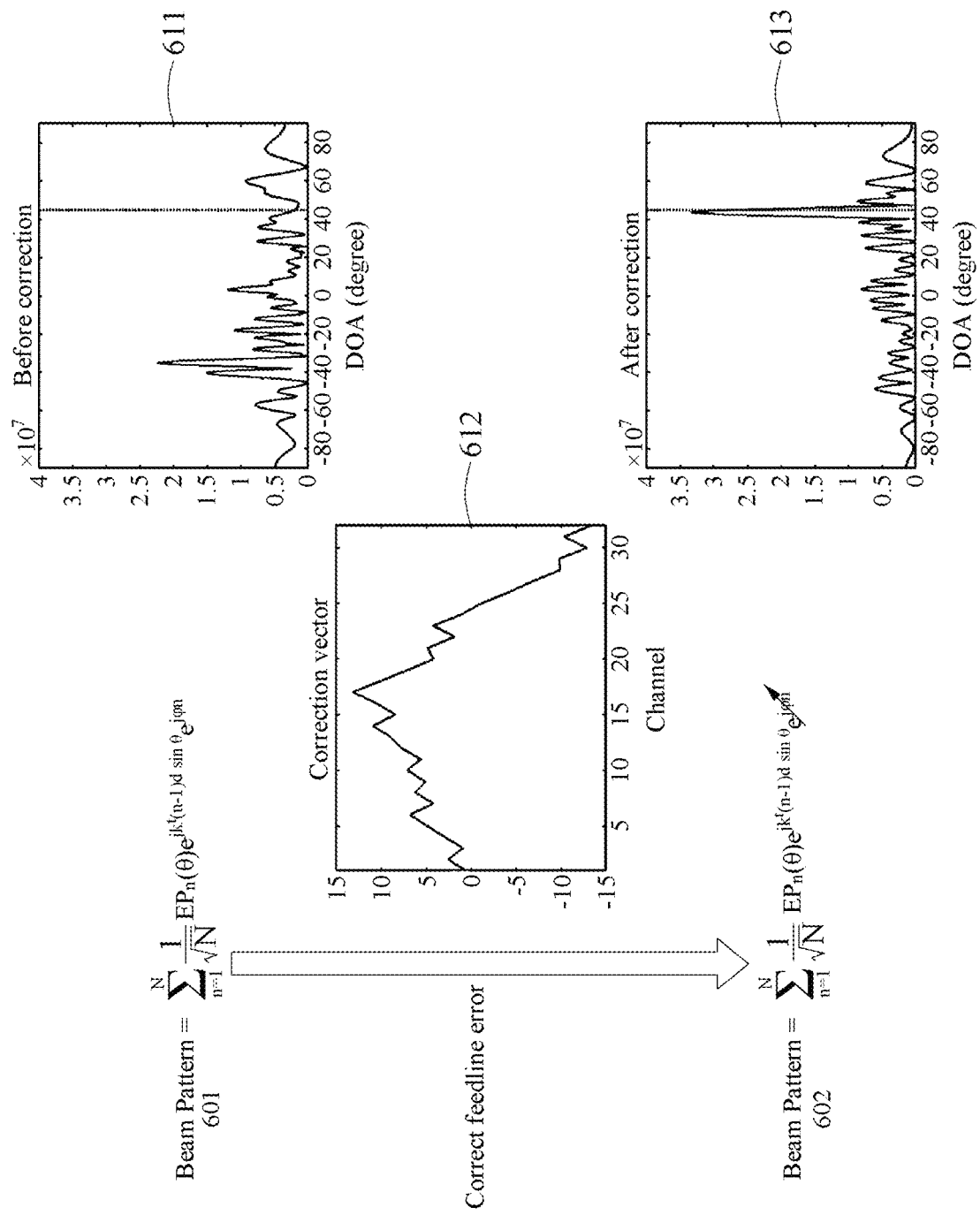
FIG. 6 illustrates an example of correcting a feedline error using a correction vector.

FIG. 6 illustrates an example of correcting a feedline error using a correction vector. Graphs 611 and 613 of FIG. 6 correspond to reference data measured with respect to a target at an angle of 45 degrees in a test environment. The graph 611 represents reference data before a feedline error is corrected, and the graph 613 represents reference data after the feedline error is corrected. The graph 611 shows a result different from the angle (45 degrees) of the target, and the graph 613 shows a result matching the angle (45 degrees) of the target. A graph 612 represents per-channel correction values of a correction vector for correcting the feedline error.

The correction values of the correction vector may be obtained in various manners. The correction values may be derived through reference data of a target positioned in front of a radar sensor (therefore, the target is at an angle of 0 degrees). More specifically, the reference data may be obtained by radiating a radar signal toward the target positioned in front of the radar sensor and receiving a signal reflected by the target through a plurality of channels in a test environment. Since the reference data are obtained in the circumstance in which the target is at an angle of 0 degrees, the phase components of the channels of the reference data should have the same value (for example, $e^0=1$).

When the phase components of the channels do not have the same value, correction values for correcting the phase components to have the same value is calculated, and a correction vector having the correction values is derived. The correction vector and the correction values may be expressed as in Equation 4.

$$C_n(\theta_0) = \frac{G_n(\theta_0)}{|G_n(\theta_0)|} \quad \text{[Equation 4]}$$

In Equation 4, C denotes the correction vector, and n denotes a channel. n may have a value between 1 and N. $C_n(\theta_0)$ denotes a correction value for an n-th channel when the target is at an angle of $\theta_0$. $\theta_0$ may be 0 degrees. G denotes reference data. $G_n(\theta_0)$ denotes reference data corresponding to the target at the angle of $\theta_0$, and $|G_n(\theta_0)|$ denotes the absolute value of $G_n(\theta_0)$. By dividing $G_n(\theta_0)$ by $|G_n(\theta_0)|$, a magnitude component is removed from $G_n(\theta_0)$, and only a phase component remains.

When the target is positioned at 0 degrees, the phase components of the channels of the reference data should have the same value (for example, $e^0=1$). If there is a feedline error, the values of the phase components may not be equally 1. In this example, there may be a channel not satisfying $G_n(\theta_0)/|G_n(\theta_0)|=1$, and a phase component of the channel may be divided by $G_n(\theta_0)/|G_n(\theta_0)|$ to be 1. Accordingly, the correction vector may be defined as expressed by Equation 4, and the correction values of the correction vector may be determined by measuring the phase components of the channels of the reference data.

When the correction vector is derived and all the correction values of the correction vector are determined, the feedline error may be removed from the radar data by dividing the phase components of the channels by the correction values in the actual use process. For example, the feedline error may be removed from the reference data by dividing a phase component of a first channel of the radar data by a correction value of $C_1(\theta_0)$ and by dividing a phase component of an n-th channel of the radar data by a correction value of $C_n(\theta_0)$. A beam pattern 602 of FIG. 6 shows the result of removing a feedline error component from a beam pattern 601 through the correction vector.

Figure 7:
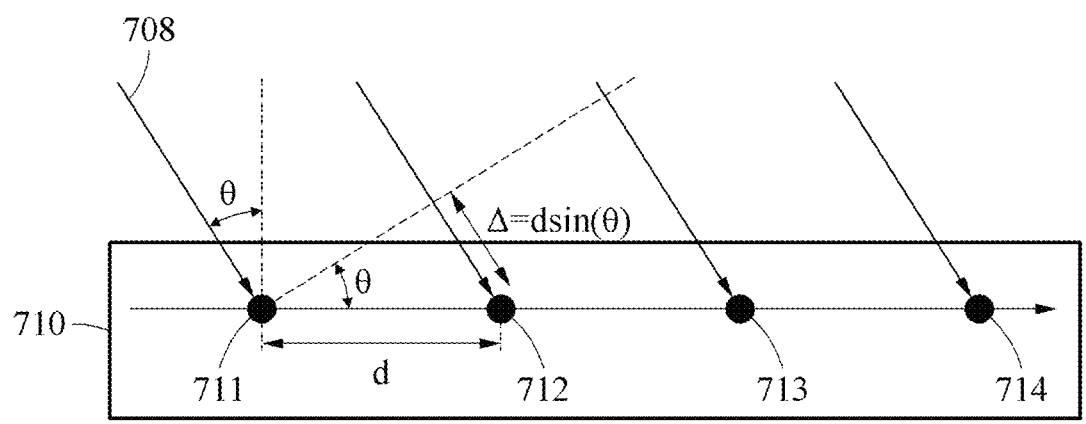
FIG. 7 illustrates examples of reception antenna elements of an array antenna.

FIG. 7 illustrates examples of reception antenna elements of an array antenna. Referring to FIG. 7, an array antenna 710 may include a plurality of reception antenna elements 711 to 714. A plurality of channels may be formed through the plurality of reception antenna elements 711 to 714. Although not shown in FIG. 7, the array antenna 710 may further include at least one of at least one transmission antenna element and at least one reception antenna element.

When a radar sensor implements a plurality of channels, phase information in radar data may indicate a phase difference between a phase of a signal received through each channel and a reference phase. The reference phase may be a predetermined phase, or may be set to a phase of one of the plurality of channels. For example, a radar signal processing apparatus may set, for a reception antenna element, a phase of a reception antenna element adjacent to the reception antenna element as the reference phase.

In addition, a processor may generate a radar vector of a dimension corresponding to the number of channels of the radar sensor from the radar data. For example, if the radar sensor includes 7 channels, the processor may generate a 7D radar vector including phase values corresponding to the channels. The phase values corresponding to the channels may be numerical values representing the phase difference described above.

For example, it may be assumed that the radar sensor includes one transmission channel and four reception channels. In this case, a radar signal radiated through the transmission channel may be reflected by a target and then received through the four reception channels. As shown in FIG. 7, if the array antenna 710 includes the plurality of reception antenna elements 711 to 714, a phase of a signal received at the reception antenna element 711 may be set as a reference phase. When a radar reception signal 708 reflected from the same target is received at the array antenna 710, an additional distance $\Delta$ between the range from the target to the reception antenna element 711 and the range from the target to the reception antenna element 712 may be expressed as in Equation 5.

$$\Delta = d \cdot \sin(\theta) \quad \text{[Equation 5]}$$

In Equation 5, $\theta$ denotes a DOA in which the radar reception signal 708 is received from the target. d denotes the distance between the reception antenna elements. denoting the speed of light in the air is treated as a constant. Since $c=f\lambda$, a phase shift W at the reception antenna element 712 due to the additional distance $\Delta$ may be derived as in Equation 6.

$$W = \frac{2\pi}{\lambda} d \cdot \sin(\theta) \quad \text{[Equation 6]}$$

The phase shift W may correspond to a phase difference between the waveform of the signal received at the reception antenna element 712 and the waveform of the signal received at the reception antenna element 711. In Equation 6, f denotes the frequency of the radar reception signal 708, and A denotes the wavelength of the radar reception signal 708. A is inversely proportional to the frequency f. If a carrier frequency change by a frequency modulation model is small, the frequency f in Equation 6 may be regarded as a single initial frequency (for example, $f_0$) in the frequency modulation model. Therefore, if only the phase shift W is determined based on the received signal, the radar signal processing apparatus may determine the DOA $\theta$.

However, if the carrier frequency of the frequency modulation model changes in a wide band (for example, a bandwidth greater than or equal to 2 GHz, in detail, of 2 GHz, 5 GHz, or 7 GHz), the carrier frequency change may not be negligible. Thus, there may occur errors during the process of estimating target information such as a DOA.

Figure 8:
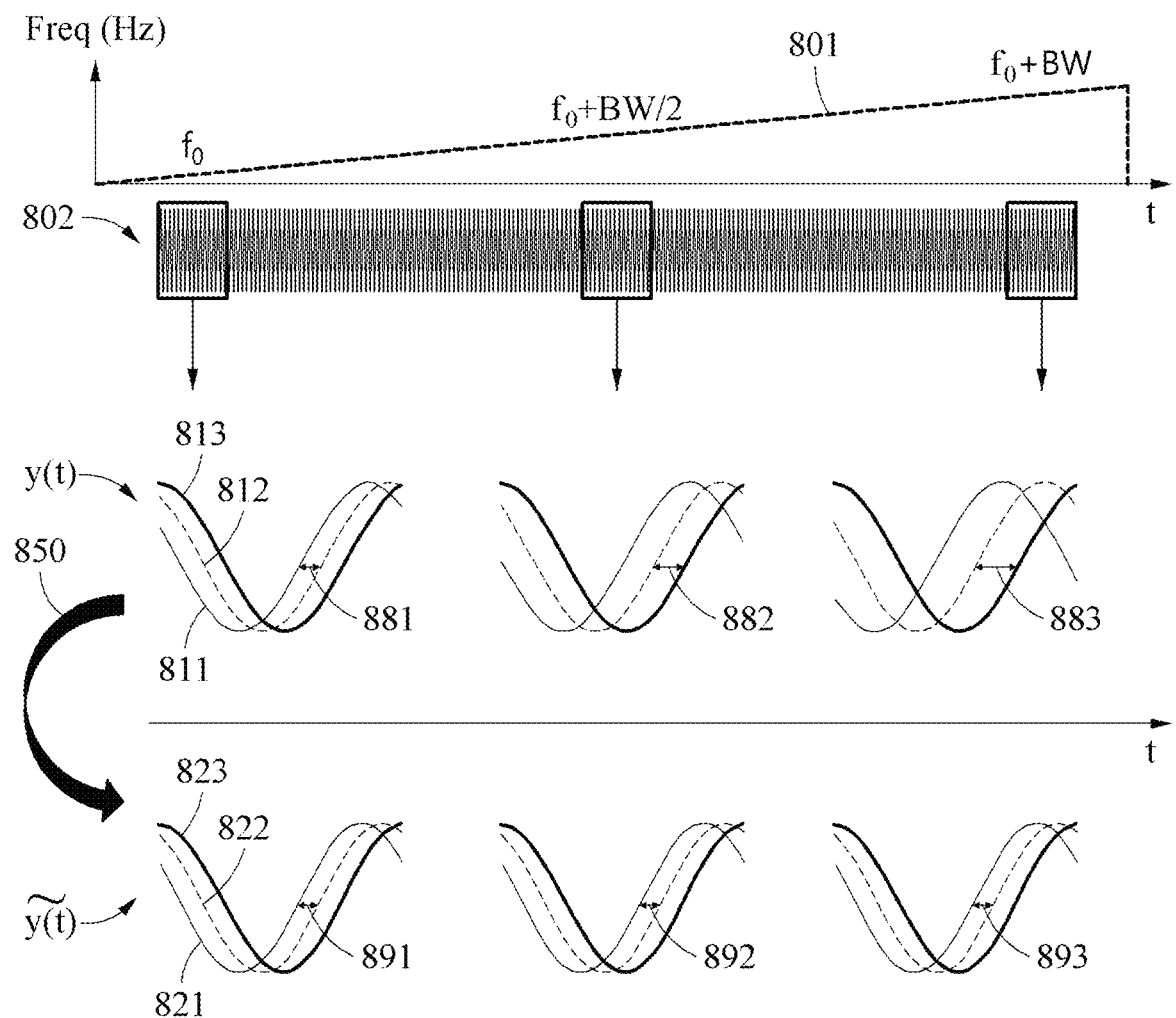
FIG. 8 illustrates an example of a phase shift according to a carrier frequency change for each sampling point in a radar signal processing method.

FIG. 8 illustrates an example of a phase shift according to a carrier frequency change for each sampling point in a radar signal processing method. For ease of description, an example in which a frequency modulation model 801 shows a pattern in which a carrier frequency linearly increases during a given transmission time will be described below. For example, a sampling interval in the frequency modulation model 801 may be an interval in which the carrier frequency linearly increases to the last frequency $f_0+BW$ that is increased from the initial frequency $f_0$ by a bandwidth BW. The bandwidth BW is a sampling bandwidth corresponding to the sampling interval, and may be smaller than the modulation bandwidth B described in Equation 1. A radar reflection signal 802 received at the radar sensor may represent a frequency corresponding to the carrier frequency described above. The radar reflection signal 802 may be individually sensed by a plurality of reception antenna elements.

Since the radar reflection signal 802 corresponding to one chirp is reflected from the same target point, round-trip delay times may be the same. Since the round-trip delay times are the same, a radar signal processing apparatus needs to calculate the same DOA at the initial point in time, the middle point in time, and the end point in time of the radar reflection signal 802. However, since the phase shift W varies with time even within one chirp due to a change in frequency, an error (the FM parasitic error described above) may occur in a phase component for DOA estimation.

For example, the radar signal processing apparatus may generate a first IF signal 811, a second IF signal 812, and a third IF signal 813 based on a radar transmission signal and radar reception signals received respectively through a first reception antenna element, a second reception antenna element, and a third reception antenna element. In this example, a phase shift 881 at an initial point in time, a phase shift 882 at a middle point in time, and a phase shift 883 at an end point in time may occur within a predetermined chirp.

The radar signal processing apparatus may generate phase normalized radar data through phase normalization 850 of the carrier frequency. In FIG. 8, y(t) denotes an IF signal, and $\overline{y(t)}$ denotes phase normalized radar data. A first IF signal 821, a second IF signal 822, and a third IF signal 823 in the phase normalized radar data may exhibit the same phase shifts 891, 892, and 893 during a chirp interval of the radar reflection signal 802, as shown in FIG. 8. Therefore, the radar signal processing apparatus may eliminate FM parasitic errors through phase normalization.

Figure 9:
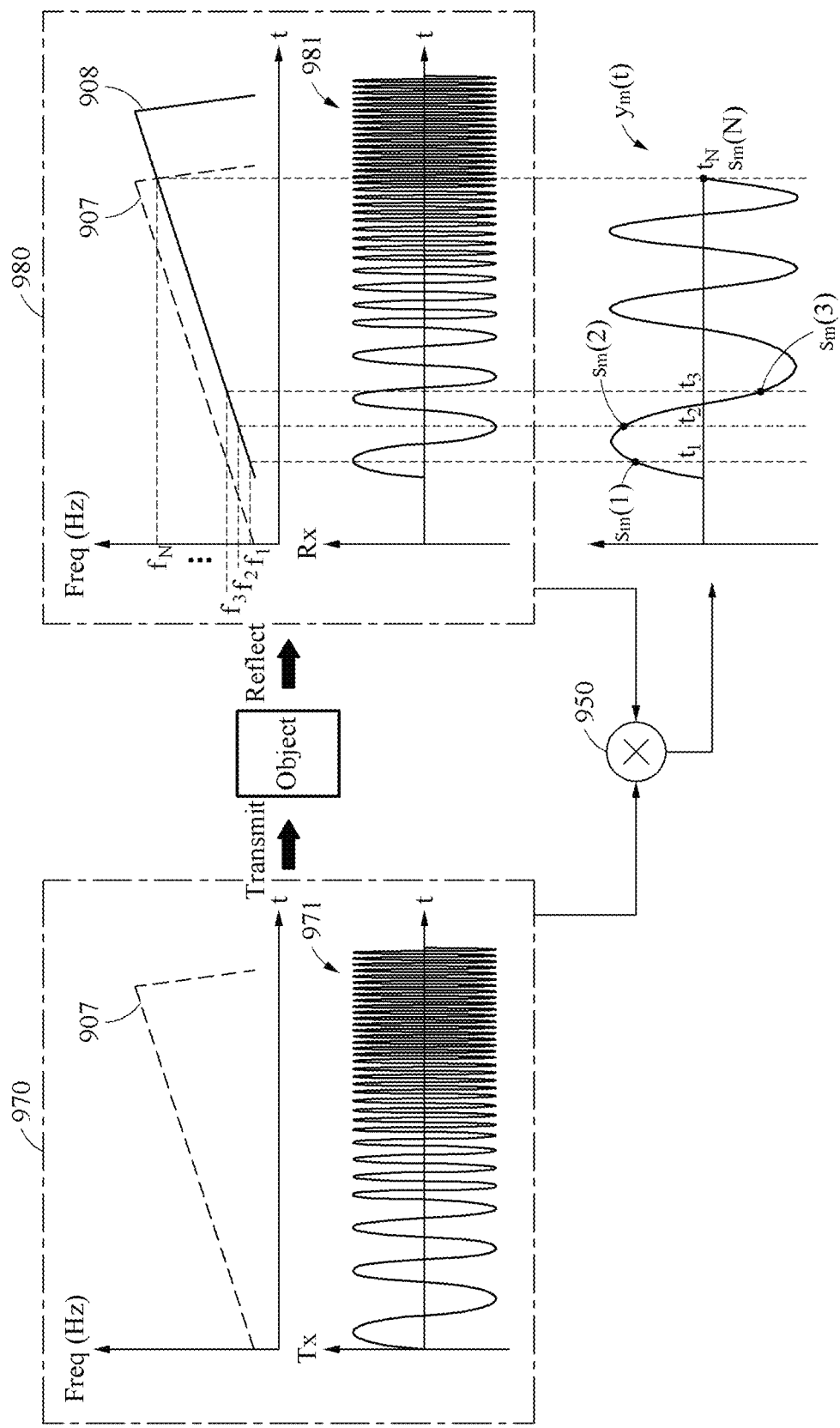
FIG. 9 illustrates an example of sampling an intermediate frequency (IF) signal.

FIG. 9 illustrates an example of sampling an intermediate frequency (IF) signal. A radar signal processing apparatus may obtain an IF signal based on a radar transmission signal 970 generated based on a frequency modulation model and a radar reception signal 980 received as the radar transmission signal 970 is reflected by a target. For example, the radar signal processing apparatus may calculate the IF signal corresponding to a frequency change between a frequency 907 of the radar transmission signal 970 and a frequency 908 of the radar reception signal 980.

The radar signal processing apparatus may not directly measure an IF $f_{IF}$. The radar signal processing apparatus may measure a signal waveform 981 of the radar reception signal 980, and generate the IF signal based on a pre-provided signal waveform 971 of the radar transmission signal 970 and the measured signal waveform 981 of the radar reception signal 980. The radar signal processing apparatus may calculate the IF signal described above, from frequency mixing 950 (for example, multiplication) of the radar transmission signal 970 and the radar reception signal 980.

$y_m(t)$ in FIG. 9 denotes the IF signal calculated with respect to the radar transmission signal 970 and the radar reception signal 980 received through an m-th reception antenna element among M reception antenna elements. M may be an integer greater than or equal to 2, and m may be an integer between 1 and M, inclusive. For reference, FIG. 9 shows the radar transmission signal 970, the radar reception signal 980, and the IF signal with frequencies lower than actual for better understanding, and the frequencies of the signals are not limited to those shown in FIG. 9.

The radar signal processing apparatus may obtain sampling data by sampling the IF signal at a plurality of sampling points. The sampling data may include sampling values obtained at predetermined sampling points. For example, referring to FIG. 9, $s_m(i)$ denotes a value obtained by sampling an intensity of a signal received by the m-th reception antenna element, among the M reception antenna elements, at an i-th sampling point. i denotes a sample index, and N denotes the number of samplings of the IF signal, wherein N may be an integer greater than or equal to 1, and i may be an integer between 1 and N, inclusive. The radar data may be determined based on the sampling data. For example, the sampling data may be determined to be the radar data, or a result of performing some processing on the sampling data may be determined to be the radar data.

As shown in FIG. 9, a phase shift may vary at each sampling point due to such a carrier frequency change between the radar transmission signal 970 and the radar reception signal 980. Due to the frequency change for each sampling point described above, the frequency and phase of the IF signal may change without being fixed, as shown in FIG. 9. For ease of description, FIG. 9 shows a time delay clearly appearing between the radar transmission signal 970 and the radar reception signal 980. However, since a radar signal propagates at the speed of light, such a time delay is very small, and a corresponding frequency difference is also very small. Thus, the carrier frequency of the radar transmission signal 970 and the carrier frequency of the radar reception signal 980 may be regarded as being substantially the same at a provided sampling point.

Although a method of processing a radar signal is mainly described herein, examples are not limited thereto. The phase normalization described above may be generally applied to a reflection signal that is received when a transmission signal of which the carrier frequency changes according to a frequency modulation model is transmitted by a signal processing apparatus for performing a signal processing method and is reflected from a target point. For example, the transmission signal and the reflection signal are signals that propagate with waves according to the carrier frequency, and may be radar signals, ultrasonic signals, electromagnetic wave signals, or optical signals.

Figure 10:
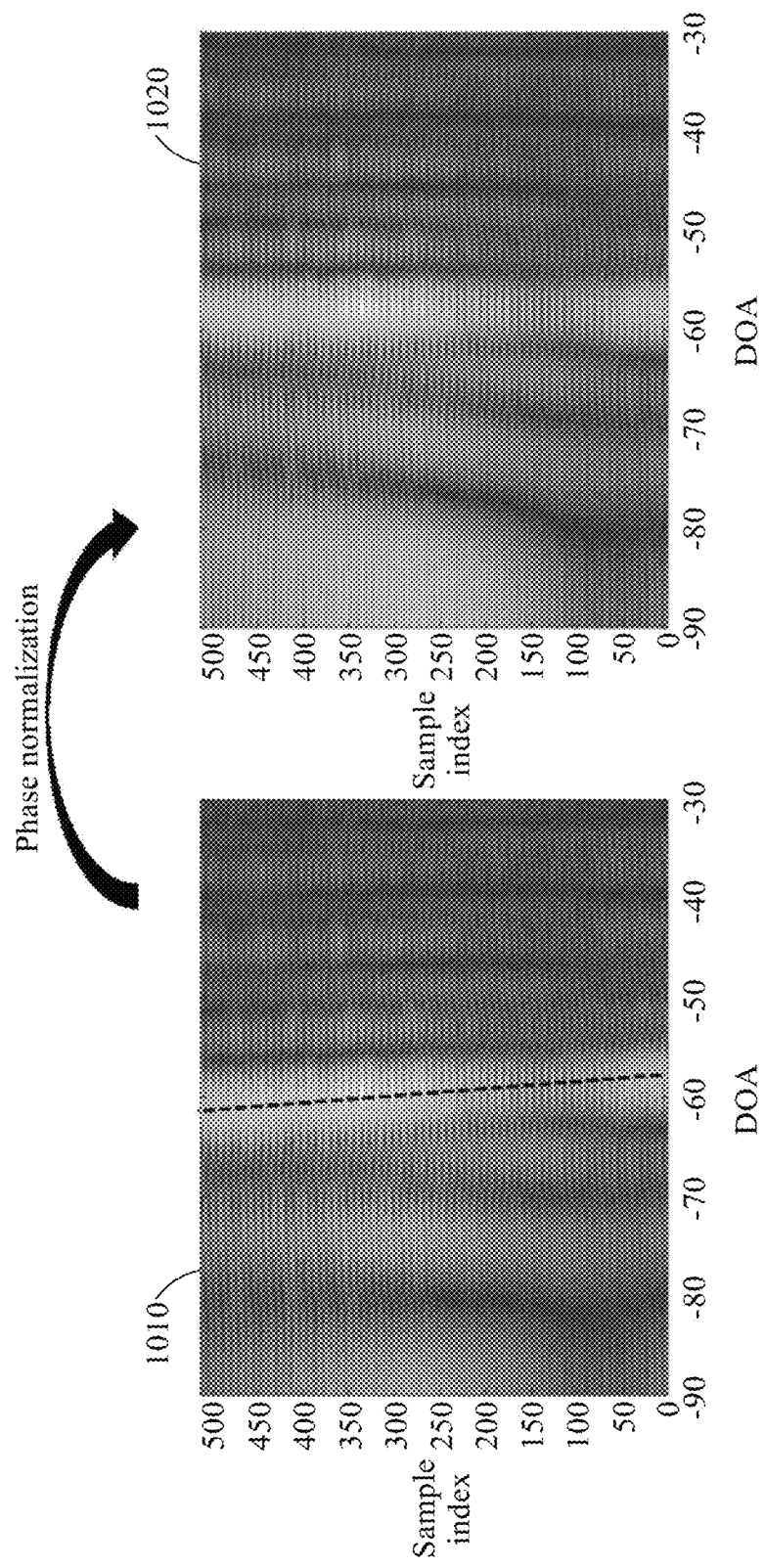
FIG. 10 illustrates an example of correcting a frequency modulation (FM) parasitic error through phase normalization.

FIG. 10 illustrates an example of correcting a frequency modulation (FM) parasitic error through phase normalization. According to FMCW described above, the carrier frequency may change over time. An AF of an array antenna may be defined by reflecting such a change in the carrier frequency, as expressed by Equation 7.

$$AF(\theta) = \frac{1}{\sqrt{N}} \sum e^{jk^t(N-1)d\sin\theta} e^{j\varphi} \nearrow N \qquad \text{[Equation 7]}$$

In Equation 7, n denotes an index for identifying an antenna element. n may be an integer value between 1 and N. N is the total number of antenna elements. $k^t$ denotes a wave number at time t. d denotes the distance between two neighboring antenna elements. n denotes a feedline delay in the n-th antenna element. Equation 7 represents an AF in which a feedline error is removed, showing the component $e^{j\varphi_n}$ according to the feedline error is removed. $k^t$ in Equation 7 may be expressed as in Equation 8.

$$\frac{2\pi\left(f_c + \frac{B}{T_{chirp}} t\right)}{c} = \frac{2\pi}{\lambda^t} = k^t : \text{FM depdent wave number} \qquad \text{[Equation 8]}$$

In Equation 8, $f_c$ denotes the carrier frequency, B denotes a modulation bandwidth, $T_{chirp}$ denotes the length of time of a rising interval of the carrier frequency in the frequency modulation model, c denotes the speed of light, λ denotes the wavelength, k denotes the wave number, and t denotes time. According to Equations 7 and 8, λ and k depend on the time t. This results from the frequency modulation model of FMCW, and FM parasitic errors may occur accordingly. When phase normalization is applied to Equations 7 and 8, Equations 9 and 10 may be derived. In Equations 9 and 10, k corresponds to a constant, such that FM parasitic errors do not occur.

$$AF(\theta) = \frac{1}{\sqrt{N}} \sum e^{jk'(N-1)d\sin\theta} e j\varphi \nearrow N \quad \text{[Equation 9]}$$

$$\frac{2\pi f_c}{c} = \frac{2\pi}{\lambda(\tau)} = k : \text{Wave number} \quad \text{[Equation 10]}$$

The phase shift W in Equation 6 may be redefined in terms of $\omega(\tau)$ as in Equation 11.

$$\omega(\tau) = \frac{2\pi}{\lambda(\tau)} \sin\theta_{GT} \quad \text{[Equation 11]}$$

In Equation 11, $\omega(\tau)$ is a phase shift according to $\tau$. $\tau$ denotes the sample index (time index). Since an FM parasitic error occurs as the carrier frequency changes while the DOA is fixed, $\omega(\tau)$ may be defined as that $\lambda$ changes while $\theta$ is fixed. $\theta_{GT}$ denotes a fixed DOA. If $\theta$ is defined as changing, $\lambda$ may be fixed to $\lambda_0$. Accordingly, Equation 12 may be defined. In addition, Equation 13 may be defined according to Equation 12.

$$\frac{2\pi}{\lambda(\tau)} \sin\theta_{GT} = \frac{2\pi}{\lambda(\tau)} \sin\theta(\tau) \quad \text{[Equation 12]}$$

$$\theta(\tau) = \sin^{-1}\left(\frac{\lambda_0}{\lambda(\tau)} \sin\theta_{GT}\right) = \sin^{-1}\left(\frac{f(\tau)}{f_0} \sin\theta_{GT}\right) \quad \text{[Equation 13]}$$

$f(\tau) = f_c + (B/T_{chirp})\tau$ may be expressed based on Equation 8, and be substituted into Equation 13 to calculate the change in DOA according to $\tau$. For example, a line 1010 of FIG. 10 may be derived according to the result of calculation. Lines 1010 and 1020 represent DOAs according to the sample index. The line 1010 that is slanted indicates that the DOA changes over time and there is an FM parasitic error. Phase normalization may be performed through various methods for changing the line 1010 to the line 1020 by compensating for a change in the DOA.

The FM parasitic error may be compensated for by referring to a radar design parameter (for example, $f(\tau)$). For example, a separate sub-direction matrix may be designed according to the sample index (for example, $\tau = 0, 1, 2, \ldots, 511$). Thus, the direction matrix may include sub-direction matrices respectively corresponding to different sample indices. In an example, sub-direction matrices corresponding to the number of sample indices (for example, 512) may be derived. In this example, Equation 11 may be used to determine phase values for channels of direction vectors of each sub-direction matrix.

In an example, a first sub-direction matrix of the direction matrix is designed for a first sample index, and a second sub-direction matrix of the direction matrix is designed for a second sample index. In an example, during the actual use process, the first sub-direction matrix may be used for first sub-radar data of the radar data corresponding to the first sample index, and the second sub-direction matrix may be used for second sub-radar data of the radar data corresponding to the second sample index. Hereinafter, sub-radar data and a sub-direction matrix will be described further.

For example, the sampling data Y may be expressed as in Equation 14. The sampling data Y may correspond to radar data.

$$Y = [Y(1), Y(2), \ldots, Y(i), \ldots, Y(N-1), Y(N)] \quad \text{[Equation 14]}$$

In Equation 14, i denotes a sample index, and N denotes the number of samplings of the sampling data, wherein N may be an integer greater than or equal to 1, and i may be an integer between 1 and N, inclusive. If an antenna array of a radar sensor forms M channels, sampling data Y(i) at an i-th sampling point corresponding to a sample index i may be expressed as in Equation 15. The sampling data Y(i) may correspond to sub-radar data.

$$Y(i) = [s_1(i), s_2(i), \ldots, s_m(i), \ldots, s_{M-1}(i), s_M(i)]^T \quad \text{[Equation 15]}$$

In Equation 15, $s_m(i)$ denotes a value obtained by sampling an intensity of a signal received by an m-th sub-reception antenna, among M sub-reception antennas, at the i-th sampling point. M may be an integer greater than or equal to 2, and m may be an integer between 1 and M, inclusive. Further, the direction matrix may be expressed as in Equation 16, and a direction vector of the direction matrix may be expressed as in Equation 17

$$A_{f_i} = [a_{f_i}(\theta_1), \ldots, a_{f_i}(\theta_k), \ldots, a_{f_i}(\theta_K)]^T \quad \text{[Equation 16]}$$

$$a_{f_i}(\theta_K) = \left[1, e^{\frac{j2\pi d}{\lambda_{f_i}} \sin\theta_k}, \ldots, e^{\frac{j2\pi(M-1)d}{\lambda_{f_i}} \sin\theta_k}\right] \quad \text{[Equation 17]}$$

In Equation 16, the direction matrix $A_{fi}$ may be expressed as a set of direction vectors $\alpha_{fi}(\theta_k)$. Here, K may be an integer greater than or equal to 1, and k may be an integer between 1 and K, inclusive. For example, if an FoV of radar is 180 degrees and K is 512, the angle resolving power may be 0.35 degrees. However, examples are not limited thereto. The angle resolving power may be 1 degree if K is 180, and may be 0.5 degrees if K is 360. K may be determined depending on the desired angle resolving power (for example, less than or equal to 1 degree). Here, each $A_{fi}$ (for example, $A_{f1}, A_{f2}, \ldots, A_{fN}$) according to a change in the sample index i may correspond to a sub-direction matrix.

In Equation 17, d denotes the distance between radar antenna elements. $\lambda_{fi}$ denotes a wavelength corresponding to the carrier frequency at the i-th sample index, and $\theta_k$ denotes a k-th direction angle in $A_{fi}$. $\alpha_{fi}(\theta_k)$ denotes a direction vector corresponding to the direction angle $\theta_k$ at the carrier frequency corresponding to the i-th sample index of the frequency modulation model.

In an example, $A_{fi}$ may be a K×M matrix including K rows and M columns. $A_{fi}Y(i)$, the result of matrix multiplication between the direction matrix $A_{fi}$ according to Equation 16 and Y(i) according to Equation 15, may be calculated as a (K×1)-dimensional vector. In the matrix multiplication result $A_{fi}Y(i)$, an element in a k-th row may be a value corresponding to the probability of the DOA of Y(i) being a k-th steering angle $\theta_k$ and may indicate DOA information. For example, the result of operation between the i-th sampling data Y(i) (corresponding to sub-radar data) and the i-th direction matrix $A_{fi}$ (corresponding to a sub-direction matrix) may correspond to DOA information related to the i-th sampling data Y(i) (corresponding to the sub-radar data).

Figure 11:
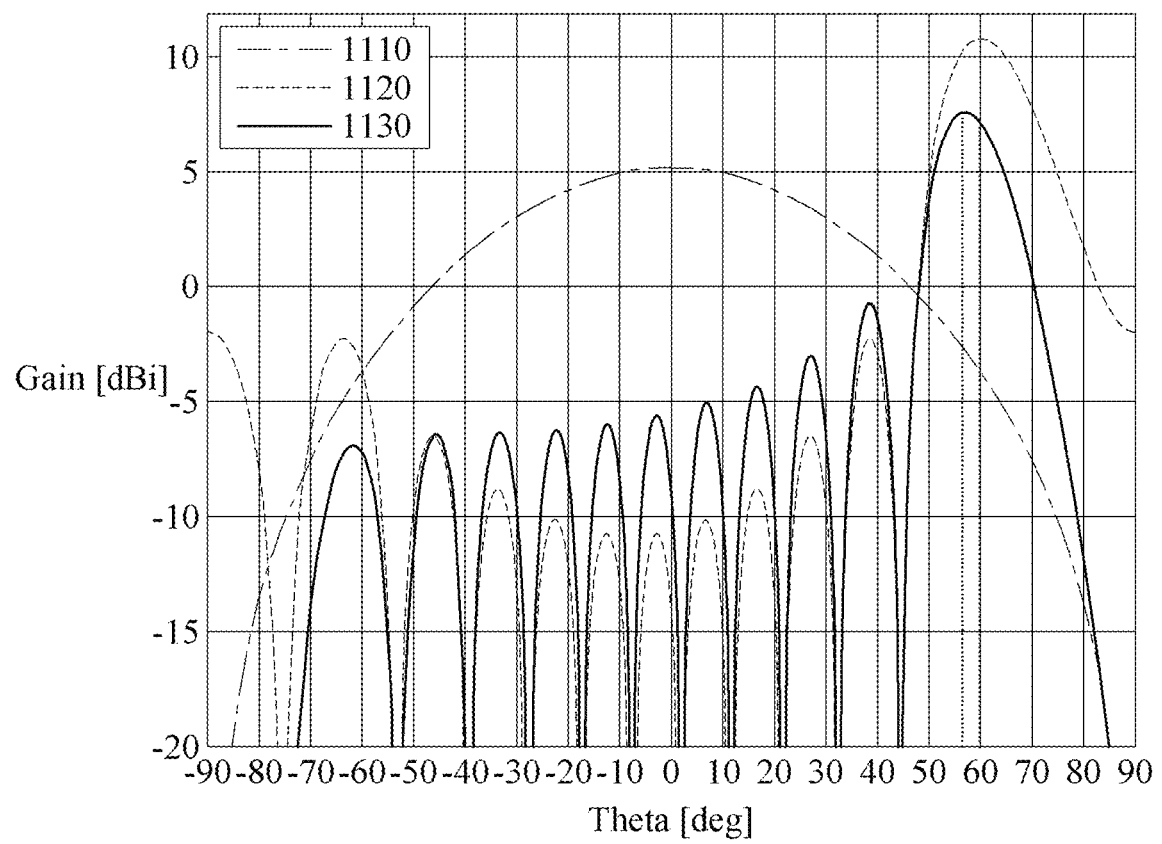
FIGS. 11 and 12 illustrate examples of correcting an element beam pattern (EBP) error.
Figure 12:
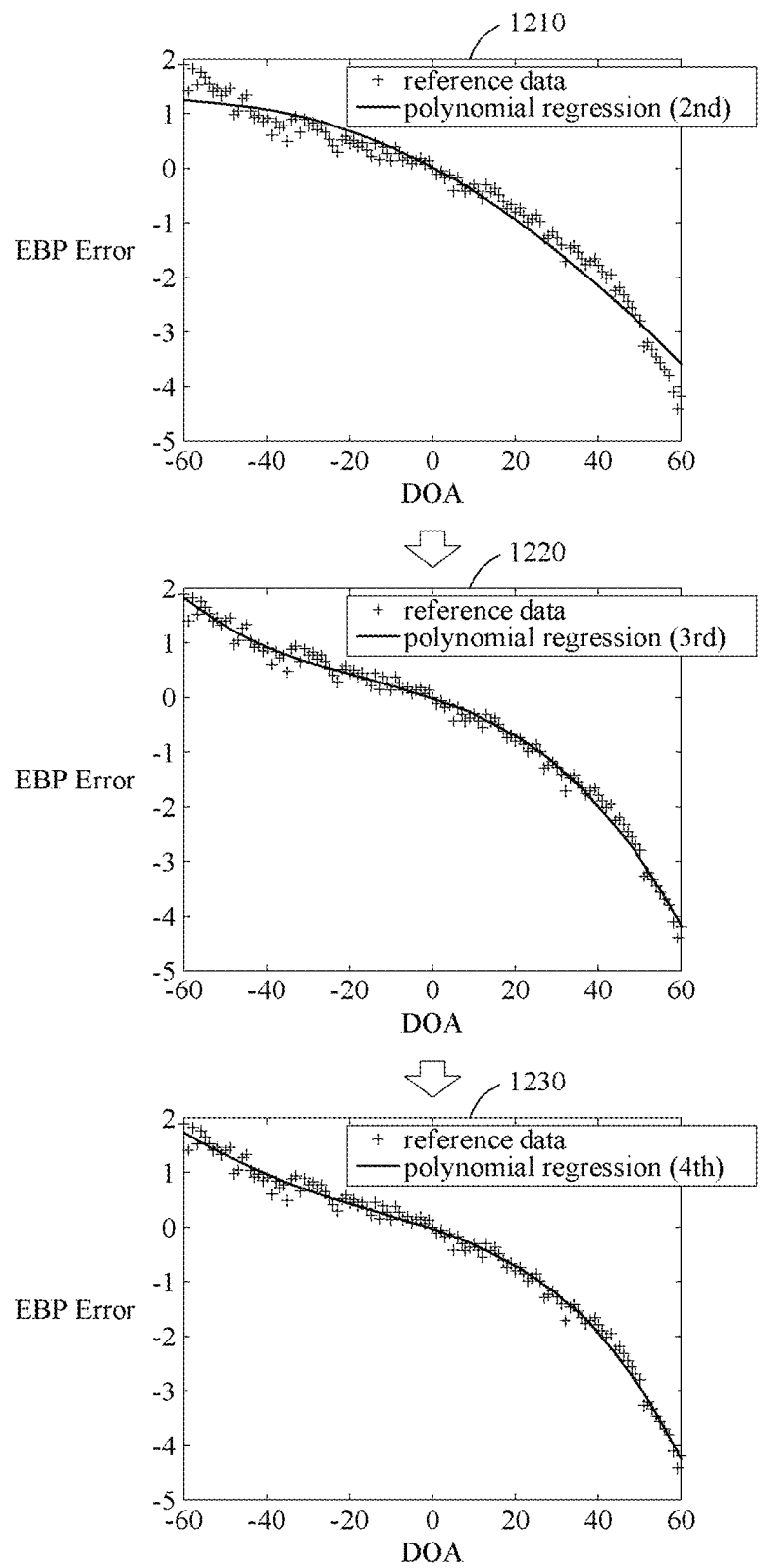

FIGS. 11 and 12 illustrate examples of correcting an element beam pattern (EBP) error. A beam pattern of an array antenna may be defined as in Equation 18.

$$\text{Beam Pattern} = \sum_{n=1}^{N} \frac{1}{\sqrt{N}} EP_n(\theta) e^{jk(n-1)d\sin\theta} e^{j\varphi} \nearrow n \quad \text{[Equation 18]}$$

$$= EP(\theta) \frac{1}{\sqrt{N}} \sum_{n=1}^{N} e^{jk(n-1)d\sin\theta+\varphi} \nearrow n$$

$$= EP(\theta) \times AF(\theta)$$

Referring to Equation 18, after a feedline error is removed and an FM parasitic error is removed, the beam pattern of the array antenna may be classified into an array factor (AF) component and an element pattern (EP) component. For example, as described above, the feedline error may be removed through a correction vector, and the FM parasitic error may be removed through a specialized design of the direction matrix.

When antenna elements have the same EP, that is, assuming $EP=EP_1= \ldots =EP_N$ (where N is the number of antenna elements), graphs related to the antenna pattern as shown in FIG. 11 may be obtained. In FIG. 11, a graph 1110 corresponds to the EP, a graph 1120 corresponds to the AF, and a graph 1130 corresponds to the beam pattern (BP). Referring to FIG. 11, the beam pattern is not formed fully according to the AF, but is affected by the EP, and in this process, an error caused by the EP may be included in the radar data. Such an error may be referred to as an EBP error.

An EBP error model may be used to correct the EBP error. The EBP error model may represent EBP error values for each angle. The EBP error model may be generated by estimating EBP error values for other angles based on EBP error values for base angles measured through a test. For example, the other EBP error values may be estimated through polynomial regression (PR), or various interpolation or fitting techniques.

A base EBP error may be determined by measuring reference data for several base angles (for example, −40 degrees, 0 degrees, and 40 degrees). A feedline error in the reference data may be corrected through a correction vector, and the EBP error may be determined through the comparison between the corrected reference data and sub-direction matrices for each sample index. For example, if the DOA of −58 degrees is estimated as a result of the comparison to the sub-direction matrix although the corrected reference data is obtained through a target at −60 degrees, the EBP error for the DOA of −58 degrees may be determined to be 2 degrees.

When the base EBP errors for several base angles are determined as described above, an EBP error model may be obtained by performing polynomial regression or fitting based on the base EBP errors. Error values corresponding to the required resolving power may be obtained through the EBP error model. Graphs 1210 to 1230 of FIG. 12 show the results of iteratively performing polynomial regression two times, three times, and four times based on the reference data, and each line of the graphs 1210 to 1230 may correspond to an EBP error model.

The EBP error model may be estimated based on several base EBP errors because the feedline error and the FM parasitic error have been removed before that. If an EBP error model is estimated based on several base EBP errors while there exist a feedline error and an FM parasitic error, the EBP error model may not be successfully estimated. In this case, a process of securing each reference data according to the required resolving power is required, and since this process must be very precise, a lot of efforts are required. Therefore, the EBP error model may alleviate such efforts.

The EBP error model may be used in various ways. In the actual use process, if an initial DOA is derived based on sub-direction matrices for each sample index and radar data corrected using a correction vector, a final DOA may be estimated by correcting the initial DOA through a matching relationship between the DOA defined in the EBP error model and an EBP error. In further detail, a radar signal processing apparatus may determine an EBP error value matched to the initial DOA based on the EBP error model, and estimate the final DOA by correcting the initial DOA with the determined EBP error value. The correction of the initial DOA may be performed in reverse to the process of estimating the EBP error. For example, if an initial DOA of −58 degrees is derived based on corrected radar data and sub-direction matrices, and an EBP error for the DOA of −58 degrees is 2 degrees, the final DOA may be estimated to be −60 degrees.

Figure 13:
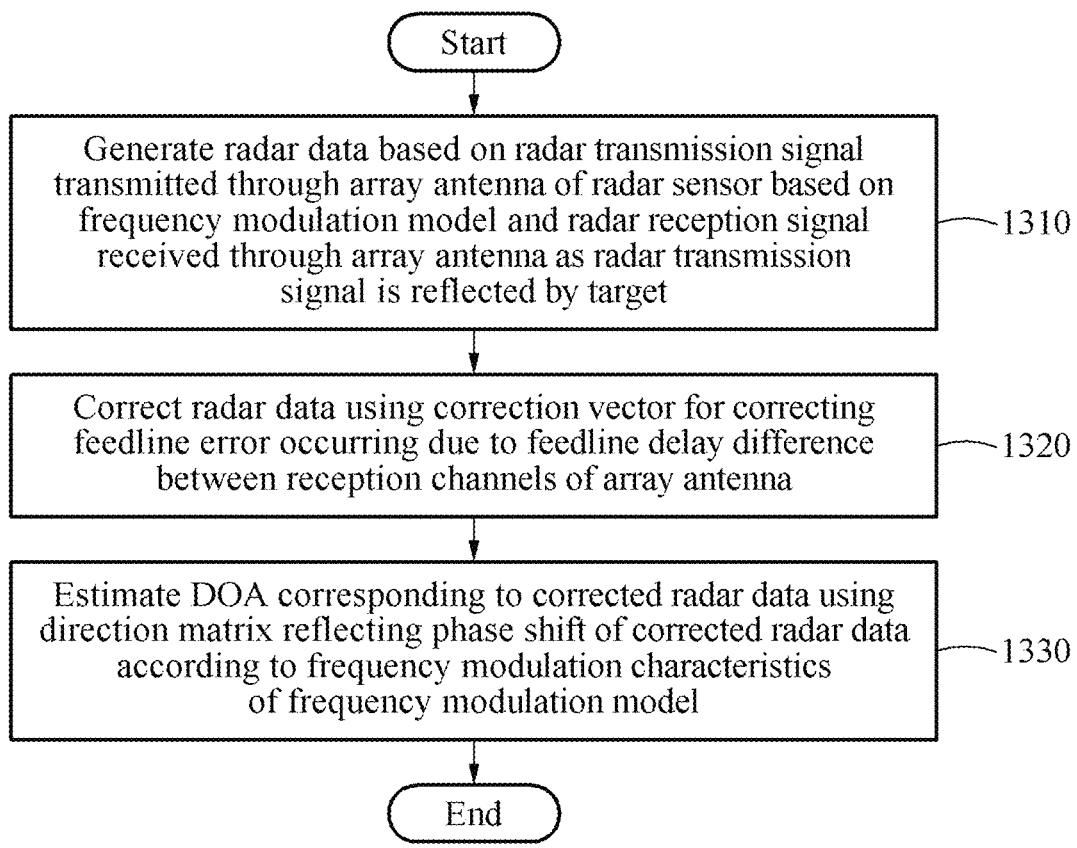
FIG. 13 illustrates an example of a radar signal processing method.

FIG. 13 illustrates an example of a radar signal processing method. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer, such as a processor, that perform the specified functions, or combinations of special purpose hardware and computer instructions. In addition to the description of FIG. 13 below, the descriptions of FIGS. 1-12 are also applicable to FIG. 13, and are incorporated herein by reference. Thus, the above description may not be repeated here.

Referring to FIG. 13, in operation 1310, a radar signal processing apparatus generates radar data based on a radar transmission signal transmitted through an array antenna of a radar sensor based on a frequency modulation model and a radar reception signal received through the array antenna as the radar transmission signal is reflected by a target. In operation 1320, the radar signal processing apparatus corrects the radar data using a correction vector for correcting a feedline error occurring due to a feedline delay difference between channels of the array antenna. In operation 1330, the radar signal processing apparatus estimates a DOA corresponding to the corrected radar data using a direction matrix reflecting a phase shift of the corrected radar data according to frequency modulation characteristics of the frequency modulation model. As described above, a phase shift (FM parasitic error) may not be corrected using the correction vector. For example, the phase shift may be corrected using sub-direction matrices for each sample index. The direction matrix reflecting the phase shift of the corrected radar data may correspond to these sub-direction matrices.

Figure 14:
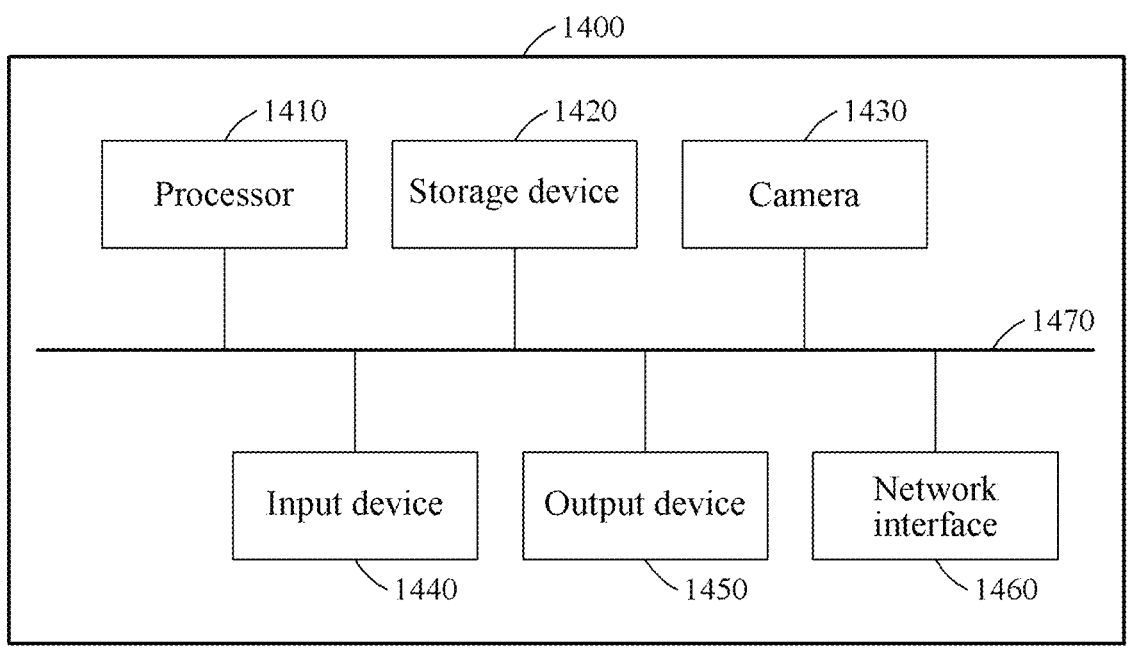
FIG. 14 illustrates an example of an electronic device.

FIG. 14 illustrates an example of an electronic device. Referring to FIG. 14, an electronic device 1400 may perform the radar signal processing method described above. For example, the electronic device 1400 may functionally and/or structurally include the radar signal processing apparatus 200 of FIG. 2. The electronic device 1400 may be, for example, an image processing device, a smart phone, a wearable device, a tablet computer, a netbook, a laptop, a desktop, a personal digital assistant (PDA), a head-mounted display (HMD), a robot, a walking assistance device, a vehicle (for example, autonomous vehicle), and a driver-assistance device to be mounted on a vehicle.

Referring to FIG. 14, the electronic device 1400 may include a processor 1410, a storage device 1420, a camera 1430, an input device 1440, an output device 1450, and a network interface 1460. The processor 1410, the storage device 1420, the camera 1430, the input device 1440, the output device 1450, and the network interface 1460 may communicate with each other through a communication bus 1470.

The processor 1410 may execute instructions or functions to be executed in the electronic device 1400. For example, the processor 1410 may process the instructions stored in the storage device 1420. The processor 1410 may perform the one or more operations described through FIGS. 1 to 13. Further details regarding the processor 1410 are provided below.

The storage device 1420 stores information or data necessary for the execution of the processor 1410. For example, a pre-calculated phase normalization matrix may be stored in the storage device 1420. The storage device 1420 may include a computer-readable storage medium or a computer-readable storage device. The storage device 1420 may store instructions to be executed by the processor 1410 and may store related information while software and/or an application is executed by the electronic device 1400. Further details regarding the storage device 1420 are provided below.

The camera 1430 may capture an image including a plurality of image frames. For example, the camera 1430 may generate a frame image.

The input device 1440 may receive an input from a user through a haptic, video, audio, or touch input. The input device 1440 may include a keyboard, a mouse, a touch screen, a microphone, or any other device that detects the input from the user and transmits the detected input.

The output device 1450 may provide an output of the electronic device 1400 to the user through a visual, auditory, or haptic channel. The output device 1450 may include, for example, a display, a touch screen, a speaker, a vibration generator, or any other device that provides the output to the user. The network interface 1460 may communicate with an external device through a wired or wireless network. The output device 1450 may provide a result of processing radar data to the user using at least one of visual information, auditory information, and haptic information.

For example, when the electronic device 1400 is mounted on a vehicle, the electronic device 1400 may visualize a radar image map through a display. As another example, the electronic device 1400 may change any one or any combination of the velocity, the acceleration, and the steering of the vehicle equipped with the electronic device 1400 based on DOA information, range information, and/or the radar image map. However, examples are not limited thereto, and the electronic device 1400 may perform functions such as ACC, AEB, BSD, LCA, and ego-localization. The electronic device 1400 may structurally and/or functionally include a control system for such control of the vehicle.

The radar signal processing apparatus, chirp transmitter 311, duplexer 312, frequency mixer 314, amplifier 315, spectrum analyzer 316, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions, or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of processing a radar signal. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing a radar signal, the method comprising:
generating radar data based on a radar transmission signal transmitted through an array antenna of a radar sensor based on a frequency modulation model and a radar reception signal received through the array antenna as the radar transmission signal is reflected by a target;
correcting the radar data using a correction vector derived from radar data corresponding to the direction of arrival of 0 degrees by removing a feedline delay difference between channels of the array antenna for correcting a feedline error occurring due to the feedline delay difference between the channels of the array antenna according to difference in arrival time of the radar transmission signal from a power divider to each transmission antenna element in the array antenna due to physical factors between the power divider and the transmission antenna elements;
estimating an initial direction of arrival corresponding to the corrected radar data using a direction matrix reflecting a phase shift of the corrected radar data according to frequency modulation characteristics of the frequency modulation model; and
estimating a final direction of arrival corresponding to the corrected radar data by removing, using an element beam pattern (EBP) model, an EBP error in the initial direction of arrival, the EBP error occurring due to an influence of a beam pattern of an antenna element in the array antenna on a beam pattern of the array antenna,
wherein the EBP error model is configured to represent EBP error values for each angle, and
wherein the EBP error model is generated by estimating EBP error values for other angles based on EBP error values for base angles pre-measured through tests.

2. The method of claim 1, wherein the correction vector is configured to correct the radar data so that phase components for the channels of the radar data have a same value, in response to the radar reception signal being received from a target positioned in front of the radar sensor.

3. The method of claim 1, wherein the direction matrix comprises sub-direction matrices respectively corresponding to different sample indices.

4. The method of claim 3, wherein the estimating of the direction of arrival comprises:
obtaining a first sub-direction matrix corresponding to a first sample index from among the sub-direction matrices; and
estimating a first direction of arrival of first sub-radar data corresponding to the first sample index from the corrected radar data using the first sub-direction matrix.

5. The method of claim 1, wherein the generating of the radar data comprises:
generating the radar data by sampling an intermediate frequency (IF) signal generated based on the radar transmission signal and the radar reception signal.

6. The method of claim 1, wherein the radar transmission signal comprises a chirp signal with a carrier frequency modulated based on the frequency modulation model.

7. The method of claim 6, wherein the radar reception signal is received through reception antenna elements in the array antenna, and the channels are formed based on the reception antenna elements.

8. The method of claim 1, further comprising:
estimating at least one of a range and a velocity for the target based on the radar data, wherein a vehicle equipped with an apparatus for processing a radar signal is controlled based on any one or any combination of the direction of arrival, the range, and the velocity.

9. A non-transitory computer-readable storage medium storing instructions that, when executed by a processor, cause the processor to perform the method of claim 1.

10. An apparatus for processing a radar signal, the apparatus comprising:
a radar sensor configured to transmit a radar transmission signal through an array antenna based on a frequency modulation model and to receive a radar reception signal through the array antenna as the radar transmission signal is reflected by a target; and
a processor configured to:
generate radar data based on the radar transmission signal and the radar reception signal;
correct the radar data using a correction vector derived from radar data corresponding to the direction of arrival of 0 degrees by removing a feedline delay difference between channels of the array antenna for correcting a feedline error occurring due to the feedline delay difference between the channels of the array antenna according to difference in arrival time of the radar transmission signal from a power divider to each transmission antenna element in the array antenna due to physical factors between the power divider and the transmission antenna elements;
estimate an initial direction of arrival corresponding to the corrected radar data using a direction matrix reflecting a phase shift of the corrected radar data according to frequency modulation characteristics of the frequency modulation model; and
estimating a final direction of arrival corresponding to the corrected radar data by removing, using an element beam pattern (EBP) model, an EBP error in the initial direction of arrival,
the EBP error occurring due to an influence of a beam pattern of an antenna element in the array antenna on a beam pattern of the array antenna,
wherein the EBP error model is configured to represent EBP error values for each angle, and
wherein the EBP error model is generated by estimating EBP error values for other angles based on EBP error values for base angles pre-measured through tests.

11. The apparatus of claim 10, wherein the correction vector is configured to correct the radar data so that phase components for the channels of the radar data have a same value, in response to the radar reception signal being received from a target positioned in front of the radar sensor.

12. The apparatus of claim 10, wherein the direction matrix comprises sub-direction matrices respectively corresponding to different sample indices, and
the processor is further configured to obtain a first sub-direction matrix corresponding to a first sample index from among the sub-direction matrices, and to estimate a first direction of arrival of first sub-radar data corresponding to the first sample index from the corrected radar data using the first sub-direction matrix.

13. A vehicle, comprising:
a radar sensor configured to transmit a radar transmission signal through an array antenna based on a frequency modulation model and to receive a radar reception signal through the array antenna as the radar transmission signal is reflected by a target;
a processor configured to generate radar data based on the radar transmission signal and the radar reception signal, to correct the radar data using a correction vector derived from radar data corresponding to the direction of arrival of 0 degrees by removing a feedline delay difference between channels of the array antenna for correcting a feedline error occurring due to the feedline delay difference between the channels of the array antenna according to difference in arrival time of the radar transmission signal from a power divider to each transmission antenna element in the array antenna due to physical factors between the power divider and the transmission antenna elements, and to estimate a final direction of arrival corresponding to the corrected radar data by removing, using an element beam pattern (EBP) model, an EBP error in an initial direction of arrival,
wherein the EBP error model is configured to represent EBP error values for each angle, and
the EBP error model is generated by estimating EBP error values for other angles based on EBP error values for base angles pre-measured through tests; and
a controller configured to control the vehicle based on the direction of arrival.

14. The vehicle of claim 13, wherein the direction matrix comprises sub-direction matrices respectively corresponding to different sample indices, and
the processor is further configured to obtain a first sub-direction matrix corresponding to a first sample index from among the sub-direction matrices, and to estimate a first direction of arrival of first sub-radar data corresponding to the first sample index from the corrected radar data using the first sub-direction matrix.

15. A method of processing a radar signal, the method comprising:
generating radar data based on a radar transmission signal transmitted through an array antenna of a radar sensor based on a frequency modulation model and a radar reception signal received through the array antenna as the radar transmission signal is reflected by a target;
correcting the radar data using a correction vector derived from radar data corresponding to the direction of arrival of 0 degrees by removing a feedline delay difference between channels of the array antenna for correcting a feedline error occurring due to the feedline delay difference between the channels of the array antenna according to difference in arrival time of the radar transmission signal from a power divider to each transmission antenna element in the array antenna due to physical factors between the power divider and the transmission antenna elements;
estimating an initial direction of arrival corresponding to the corrected radar data using a direction matrix; and
determining a final direction of arrival corresponding to the corrected radar data by removing an element beam pattern (EBP) error in the initial direction of arrival based on an EBP error model configured to represent EBP error values for each angle,
wherein the EBP error comprises an influence of a beam pattern of an antenna element of the array antenna on a beam pattern of the array antenna, and
the EBP error model is generated by estimating EBP error values for other angles based on EBP error values for base angles pre-measured through tests.

16. The method of claim 15, wherein:
the direction matrix comprises sub-direction matrices respectively corresponding to different sample indices; and the estimating of the initial direction of arrival comprises obtaining a first sub-direction matrix corresponding to a first sample index from among the sub-direction matrices, and estimating a first direction of arrival of first sub-radar data corresponding to the first sample index from the corrected radar data using the first sub-direction matrix.

\* \* \* \* \*